(12) United States Patent
Thompson et al.

(10) Patent No.: US 10,442,494 B2
(45) Date of Patent: Oct. 15, 2019

(54) SNOW VEHICLE

(71) Applicant: Arctic Cat Inc., Minneapolis, MN (US)

(72) Inventors: Kevin David Thompson, Mentor, MN (US); Ricky Allen Warne, Thief River Falls, MN (US); Andrew Jon Ellsworth, Thief River Falls, MN (US); Cord M. Christensen, Goodridge, MN (US); Andrew Beavis, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 131 days.

(21) Appl. No.: 15/439,538

(22) Filed: Feb. 22, 2017

(65) Prior Publication Data
US 2017/0259877 A1 Sep. 14, 2017

Related U.S. Application Data

(60) Provisional application No. 62/323,428, filed on Apr. 15, 2016, provisional application No. 62/298,438, filed on Feb. 22, 2016.

(51) Int. Cl.
| | |
|---|---|
| *B62L 3/02* | (2006.01) |
| *B62M 27/02* | (2006.01) |
| *B60T 11/22* | (2006.01) |
| *B62K 23/06* | (2006.01) |
| *B60T 7/10* | (2006.01) |
| *B60T 11/16* | (2006.01) |

(Continued)

(52) U.S. Cl.
CPC .............. *B62L 3/023* (2013.01); *B60T 7/102* (2013.01); *B60T 11/16* (2013.01); *B60T 11/22* (2013.01); *B62K 23/06* (2013.01); *B62M 27/02* (2013.01); *F16D 23/12* (2013.01); *F16D 25/088* (2013.01)

(58) Field of Classification Search
CPC .......... B60T 7/102; B60T 11/16; B60T 11/22; B62K 23/06; B62L 3/023; B62M 7/02; F16D 23/12; F16D 25/088
USPC ....................................................... 180/184
See application file for complete search history.

(56) References Cited

U.S. PATENT DOCUMENTS 3,845,847 A * 11/1974 Camp .................... B62K 23/06
123/198 DC
6,234,263 B1 5/2001 Boivin et al.
(Continued)

FOREIGN PATENT DOCUMENTS

WO 00/50295 8/2000

OTHER PUBLICATIONS

WO 0050295 A1, Schadler, Michael et al. (Machine Translation) (Year: 2000).*

(Continued)

*Primary Examiner* — Kevin Hurley
*Assistant Examiner* — Felicia L. Brittman
(74) *Attorney, Agent, or Firm* — Billion & Armitage; Michael A. Collins

(57) ABSTRACT

A snow vehicle having a combined brake and clutch handle is herein disclosed. Further, the snow vehicle can include a controller for managing operation of the snow vehicle, including shifting and engine management regiments, which can be selected by the operator depending upon operator preferences. Additionally, the snow vehicle can include an engine cooling heat exchanger for cooling liquid which is circulated through the engine.

16 Claims, 28 Drawing Sheets

(51) Int. Cl.
*F16D 23/12* (2006.01)
*F16D 25/08* (2006.01)

(56) References Cited

U.S. PATENT DOCUMENTS

| | | |
|---|---|---|
| 7,395,909 B2 | 7/2008 | Hutchison |
| 8,096,921 B2 * | 1/2012 | Hahn ..................... B60K 23/02 |
| | | 192/114 R |
| 8,479,860 B1 | 7/2013 | Jorgenson |
| 8,567,546 B2 | 10/2013 | Berg et al. |
| 8,794,369 B1 | 8/2014 | Cruit |
| 8,813,889 B1 | 8/2014 | Jorgenson |
| 2015/0166143 A1 | 6/2015 | Beavis |
| 2018/0273142 A1 | 9/2018 | Mangum et al. |

OTHER PUBLICATIONS

Clake One, http://www.clake.com.au/clake/, last viewed May 24, 2017.

* cited by examiner

SNOW VEHICLE

CROSS REFERENCE TO RELATED APPLICATIONS

This application claims the benefit of and priority to U.S. Provisional Application No. 62/298,438, filed Feb. 22, 2016, titled "Snow Vehicle," and having inventors: Rick Allen Warne, Andrew Jon Ellsworth, Kevin David Thompson, Cord Miller Christensen, and Andrew Beavis, the contents of which are herein incorporated by reference. This application further claims the benefit of and priority to U.S. Provisional Application No. 62/323,428, filed Apr. 15, 2016, titled "Snow Vehicle," and having inventors: Rick Allen Warne, Andrew Jon Ellsworth, Kevin David Thompson, Cord Miller Christensen, and Andrew Beavis, the contents of which are herein incorporated by reference.

BACKGROUND

Various types of snow vehicles are known in the art. Such snow vehicles suffer from a number of inadequacies, however. For example, some such vehicles can be difficult to shift. Further, some such snow vehicles suffer from vehicle architecture that is not conducive to operation in certain terrains and performance may be hindered.

SUMMARY

In light of the foregoing, there remains a need to overcome shortcomings of existing vehicle designs and components. By way of example, in some embodiments, a snow vehicle includes an endless track, a frame, an engine, and a transmission. In some embodiments, the engine and transmission are attached to the frame and the engine is drivingly coupled to the endless track via the transmission. In some embodiments, the vehicle further includes a clutch, and at least a portion of the clutch is rotatably coupled to the transmission. In some embodiments, the vehicle further includes a brake actuator and handlebars. In some embodiments, a hand lever is attached to the handlebars. The hand lever has a first position, a second position, and a third position. In some embodiments, movement of the hand lever from the first position to the second position actuates the clutch and movement of the hand lever from the second position to the third position actuates the brake actuator.

BRIEF DESCRIPTION OF THE DRAWINGS

In the drawings, which are not necessarily drawn to scale, like numerals may describe similar components in difference views. The drawings illustrate generally, by way of example, but not by way of limitation, various embodiments discussed in the present document.

DETAILED DESCRIPTION

Figure 1:
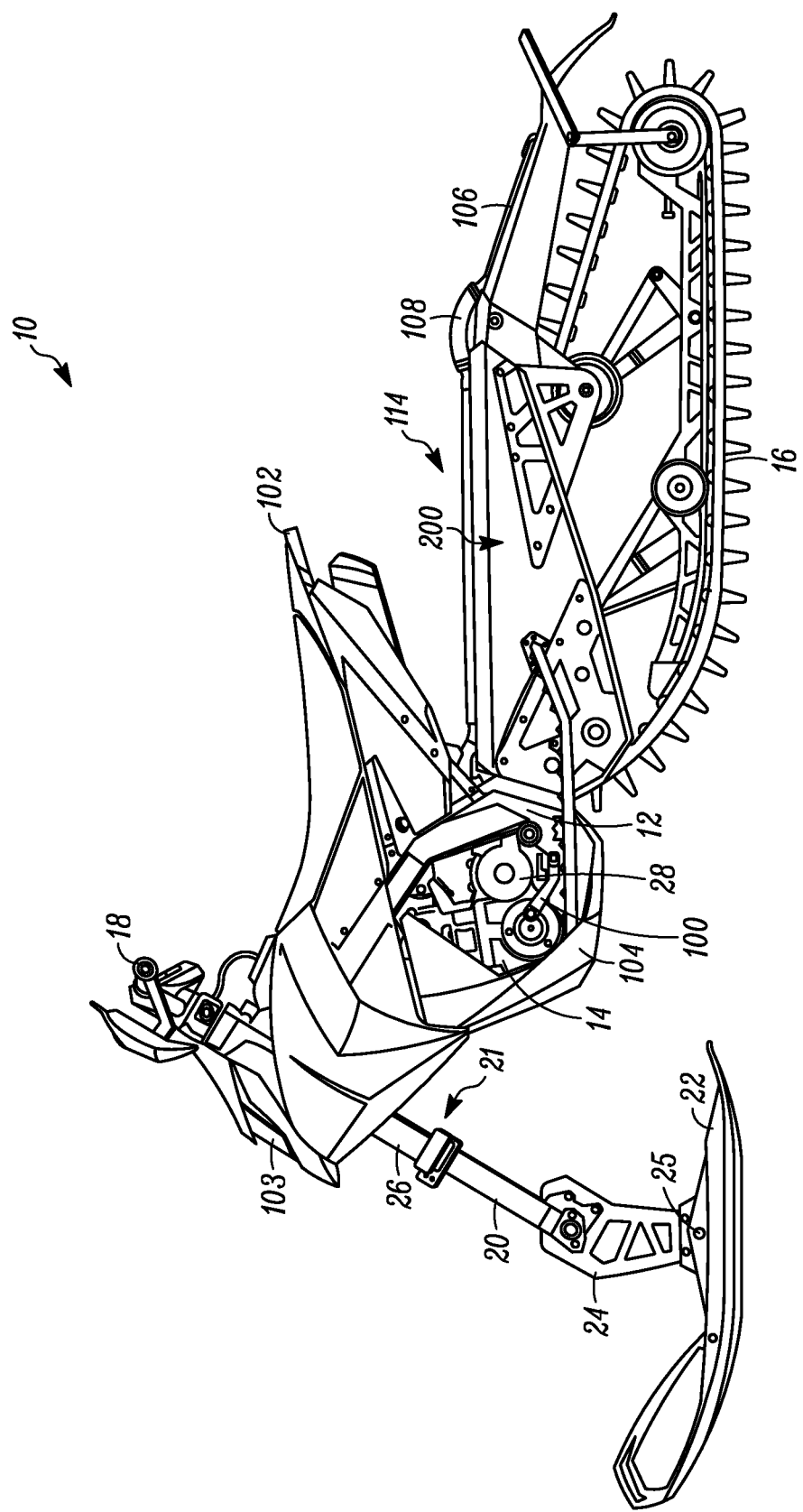
FIG. 1 shows an embodiment of a snow vehicle.

With regard to FIG. 1, a snow vehicle 10 comprises a main frame 12, a prime mover 14 (such as an engine or motor) and a track 16. The snow vehicle 10 further comprises handlebars 18 and a front suspension assembly 20. In some embodiments, the front suspension assembly 20 comprises a fork 21; in some embodiments, however, the front suspension assembly 20 comprises an A-arm suspension, or any other suitable type of suspension.

In some embodiments, the snow vehicle 10 further comprises at least one front ski 22 and at least one upright 24. As illustrated in FIG. 1, the upright 24 attaches the front ski 22 to the fork 21 and can include a pin 25 (e.g., bolt), permitting the ski 22 to pivot relative to the upright 24. In some embodiments, the snow vehicle 10 can comprise a plurality of skis 22, for example which are spaced laterally from one another. The skis 22 can be attached to the same upright 24 or different uprights. In some embodiments, for example where two skis are used in conjunction with two shocks 26 of a fork 21, each ski 22 can move along the direction of the shock 26 independently of the other ski. Stated differently, each shock 26 is coupled to one of the skis 22.

In some embodiments, the prime mover 14 is a 4-stroke engine. The prime mover 14 can also be a 2-stroke engine, an electric motor, or fuel cell, for example. Where an engine is used, it can be naturally aspirated or it can have a power adder, such as a supercharger (e.g., belt-driven, gear-driven) or turbocharger. The engine can include a carburetor or it can be fuel injected.

Figure 2:
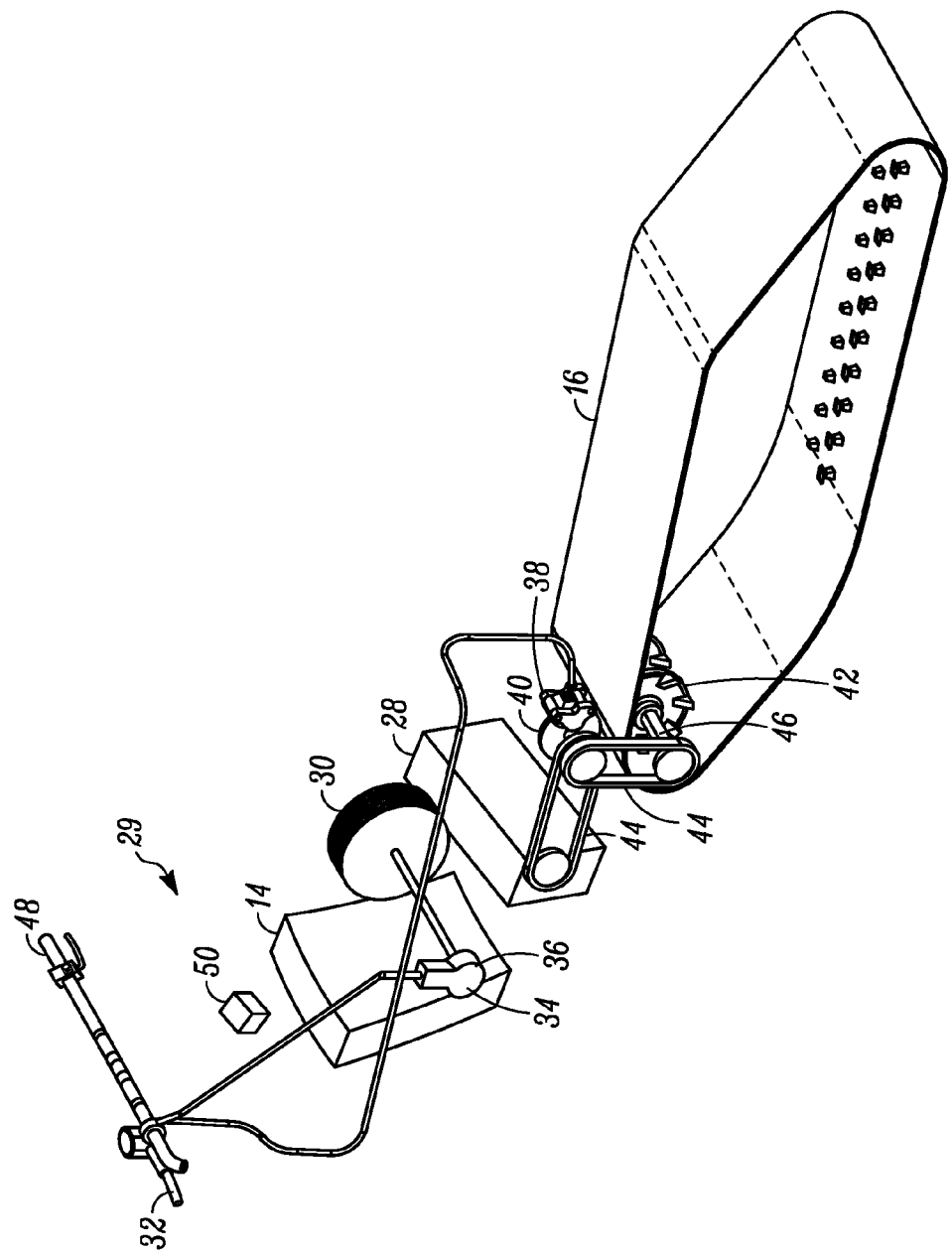
FIG. 2 shows an embodiment of a snow vehicle, including an actuator assembly.

The prime mover 14 is rotatably linked to a transmission 28 via a clutch 30 (FIG. 2) such that actuation of the clutch 30 selectively engages the transmission 28 to the prime mover 14. In some embodiments, the snow vehicle 10 includes an actuator assembly 29. In some embodiments, the clutch 30 is actuated by the operator via the actuator assembly 29, which includes a lever 32. In some embodiments, the lever 32 is attached to the handlebars 18. As shown in FIG. 2, for example, the lever 32 is attached to the left side of the handlebars 18 such that the lever 32 can be actuated with an operator's left hand, with one or more of the operator's fingers. As further shown in FIG. 2, movement of the lever 32 actuates the clutch 30 via a clutch actuator 34. The clutch actuator 34 can comprise a slave cylinder 36, for example if the clutch 30 is a hydraulic clutch. In some embodiments, the clutch actuator 34 comprises a mechanical linkage, for example a braided wire cable or push-pull cable that is attached to the lever 32.

In some embodiments, the clutch 30 is a dirt bike style clutch, for example having one or more clutch plates, friction plate, pressure plate, throw out bearing, clutch release bearing, and/or springs.

Figure 3:
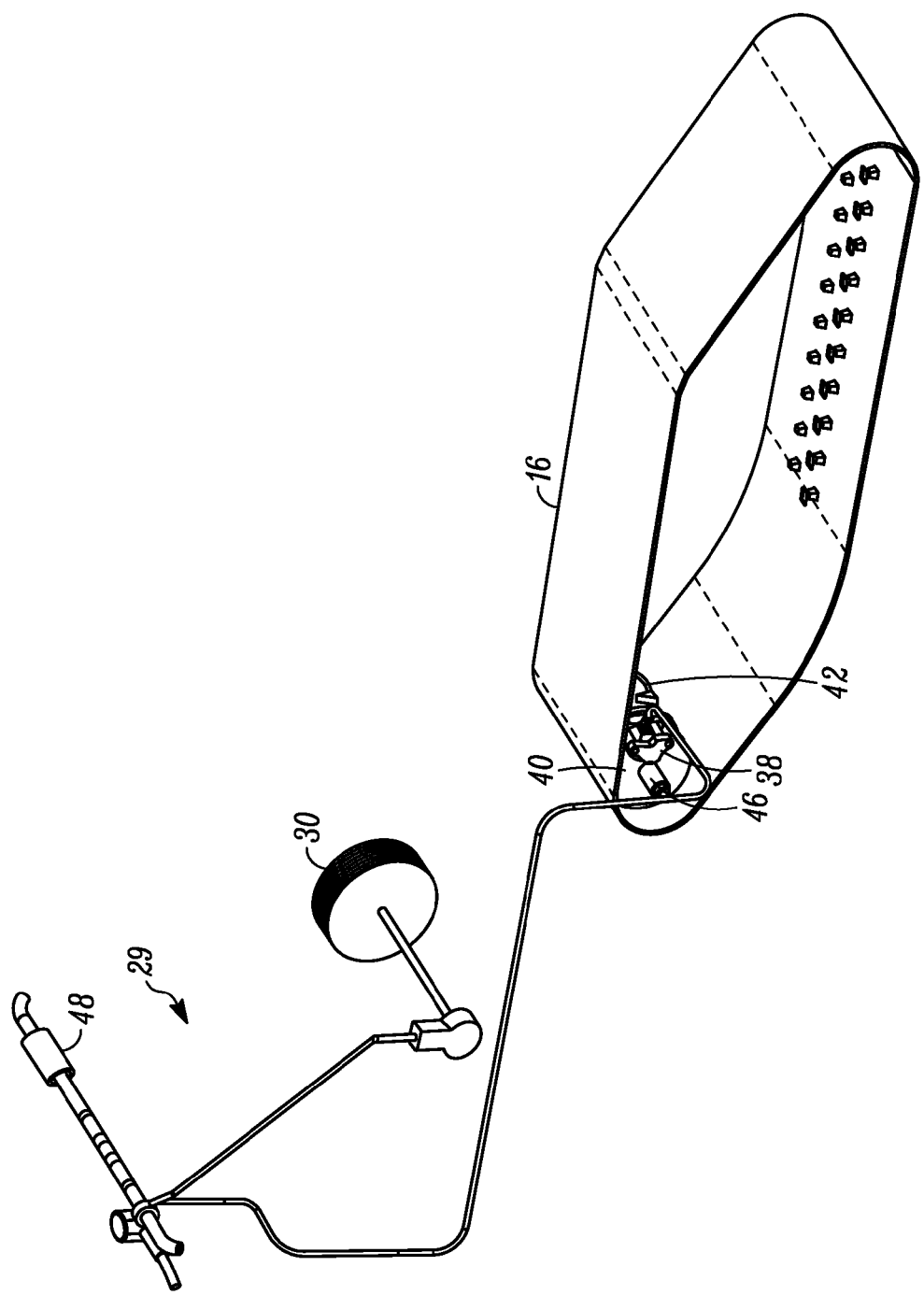
FIG. 3 shows an embodiment of a snow vehicle, including an actuator assembly.

As further shown in FIG. 2, in some embodiments, the lever 32 of the actuator assembly 29 is further linked to a brake actuator 38 (e.g., a brake caliper). The brake actuator 38 can be a hydraulic actuator or it can be actuated via a mechanical linkage, such as a brake cable that is connected to the lever 32. As illustrated in FIG. 2, in some embodiments, the brake actuator 38 is located exteriorly of the track 16. As shown in FIG. 3, however, in some embodiments, the actuator 38 is located interiorly of the track 16. As further shown in FIG. 3, a brake disc 40 is coaxial with a track drive member 42 (e.g., sprocket). In the embodiment of FIG. 2, however, it is evident that the brake disc 40 is located on an axis that is not coaxial with the axis of drive member 42. In at least some embodiments, the snow vehicle 10 further includes at least one drive belt or drive chain 44 to transmit power from the transmission to the drive axle 46 and drive member 42.

With further regard to FIG. 2, in some embodiments, the snow vehicle 10 has a throttle actuator 48. The throttle actuator 48 can comprises a thumb lever, as in FIG. 2, a twist handle, as in FIG. 3, or any other suitable type of actuator. Further, the throttle actuator can be linked directly the engine (e.g., throttle body) or it can be routed to an ETC (electronic throttle control), for example via a throttle position sensor. In some embodiments, the snow vehicle 10 includes an accelerometer 50 to measure acceleration or deceleration of the snow vehicle. In turn, the accelerometer 50 can be in electronic communication with the electronic throttle control to control track spin (e.g., "traction control"). Stated differently, if the accelerometer 50 detects that the acceleration of the snow vehicle 10 does not match the speed of track (or engine, transmission, or drive axle RPM), the ETC can limit the power output of the engine 14.

In some embodiments, an ETC can limit the power output of the engine 14, and limit track spin, by way of a controller (e.g., engine control unit (ECU)) which is programmed to compare the rate of increase of RPM (engine and/or transmission and/or drive axle) to a predetermined value. In the event that the rate of increase of RPM exceeds the predetermined value, the controller knows that the track 16 is spinning and can reduce power output of the engine, for example via the ETC, to reduce or prevent track spin. In some embodiments, the snow vehicle 10, has a switch 54 (button, toggle, or dial, see FIG. 4) to enable or disable the track spin limiting control.

Figure 4:
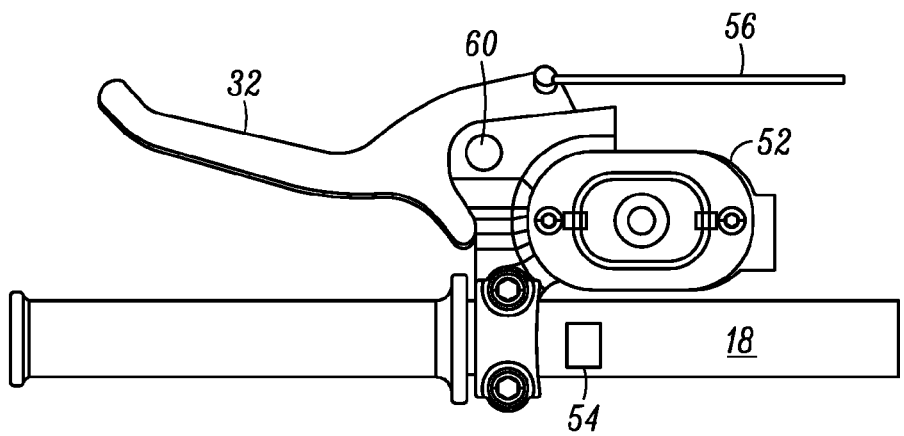
FIGS. 4 and 5 show embodiments of portions of actuator assemblies.
Figure 5:
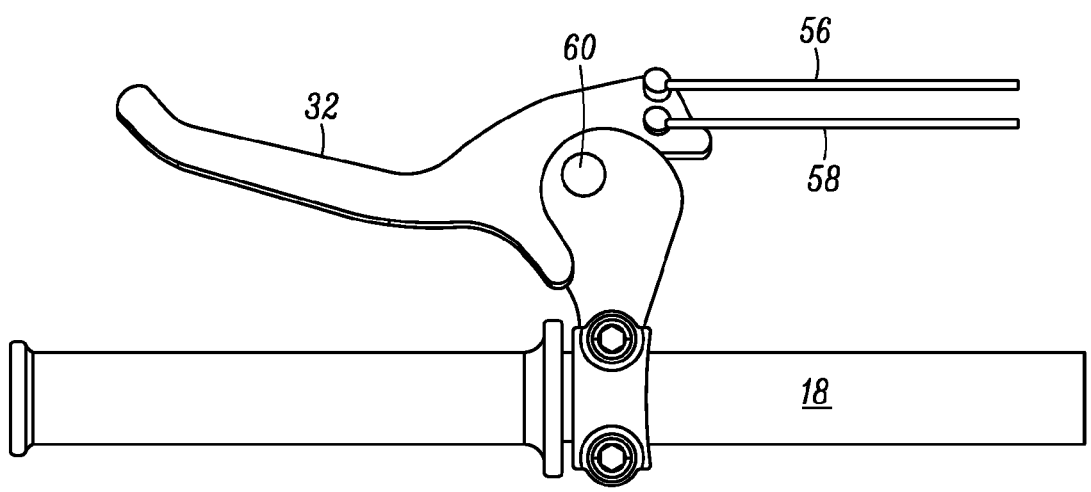

Turning to FIG. 4, in some embodiments, the combined clutch/brake lever 32 utilizes a hydraulic clutch master cylinder 52 and a mechanical brake cable or linkage 56. As shown in FIG. 5, in some embodiments, the combined clutch/brake lever 32 utilizes a mechanical clutch cable (or linkage) 58 and a mechanical brake cable (or linkage) 56. In both FIGS. 4 and 5, the combined clutch/brake lever 32 rotates about a single pivot axis 60. Any suitable combination of mechanical and hydraulic arrangements can be utilized. For example, the clutch can be a hydraulic system while the brake is mechanical; the clutch can be mechanical while the brake is hydraulic; both clutch and brake are mechanical; or both clutch and brake are hydraulic, as shown in FIG. 6.

Figure 6:
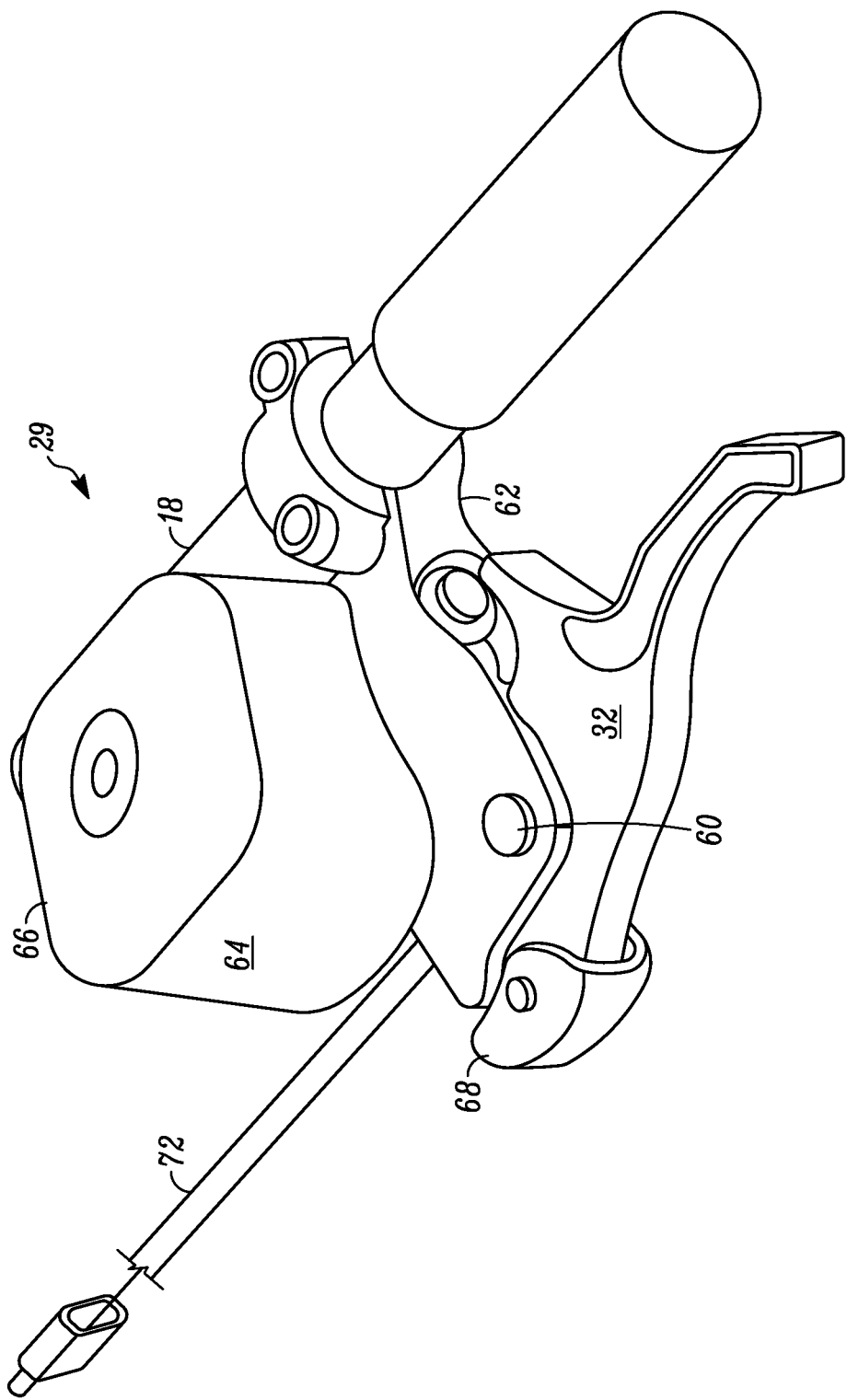
FIG. 6 shows a 3-dimensional view of a portion of an actuator assembly.

As further shown in FIG. 6, in some embodiments, the combined clutch/brake lever 32 is pivotably attached to a main body 62 via pivot axis 60. In some embodiments, the main body 62 comprises at least one fluid housing 64. The fluid housing 64 has a cover 66. The fluid housing 64 can be filled with hydraulic fluid, which is used to actuate the clutch and/or brake. In some embodiments, the clutch system and brake system share a common hydraulic reservoir. In some embodiments, however, two fluid housings 64 can be used, one each for the brake system and clutch system. Further still, in some embodiments, a single fluid housing 64 having two compartments within the fluid housing is utilized. The two compartments segregate hydraulic fluid between the respective systems. In some embodiments, the actuator assembly 29 comprises a single master cylinder and two slave cylinders; one slave cylinder for the brake actuator and one slave cylinder for the clutch actuator.

Figure 7:
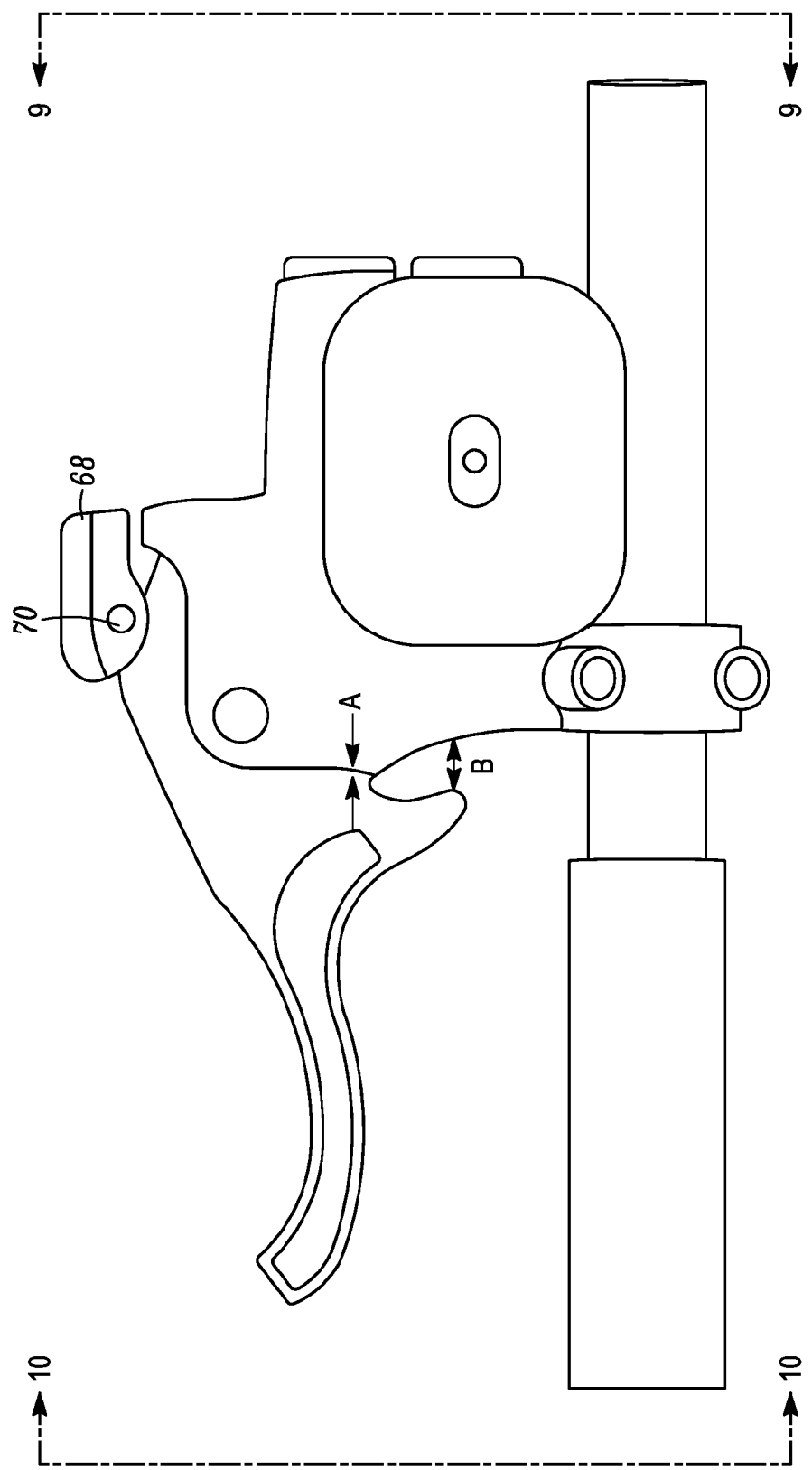
FIG. 7 shows a top view of a portion of an actuator assembly.

In some embodiments, the actuator assembly 29 includes a parking brake lock 68. The parking brake lock 68 which can be rotated about axis 70 (see FIG. 7) to lock the lever 32 against the main body 62, thereby engaging the brake actuator 38 (FIGS. 2, 3).

In some embodiments, the actuator assembly 29 comprises a mechanical emergency brake which can, optionally, be in addition to the hydraulic brake system. As shown in FIG. 6, for example, an emergency brake cable 72 can be affixed to the actuator assembly and it can be selectively engaged. In some embodiments, the mechanical emergency brake can be independent of the hydraulic brake system, for example.

Figure 8:
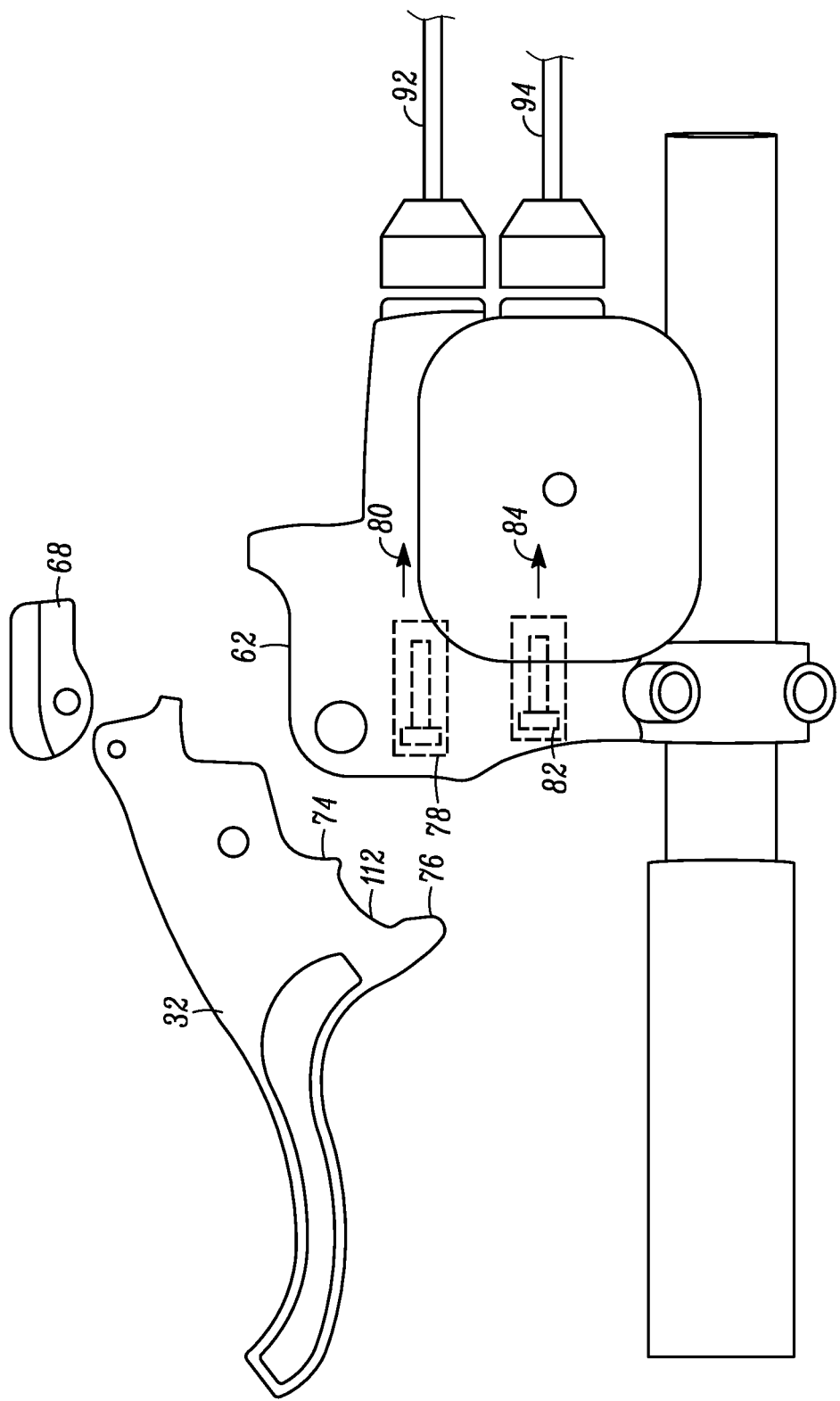
FIG. 8 shows a partially exploded view of a portion of an actuator assembly.

Turning to FIG. 8, a partially exploded view of a portion of the actuator assembly 29 is shown. As shown, in some embodiments, the lever 32 comprises a first contact surface 74 and a second contact surface 76. The first contact surface 74 is located adjacent to the first piston 78 (shown via hidden lines) such that when the operator moves the lever 32 toward the handlebars 18, the first contact surface 74 moves the first piston 78 in the direction of arrow 80. Similarly, the second contact 76 is located adjacent to the second piston 82 (shown via hidden lines) such that when the operator moves the lever 32 toward the handlebars 18, the second contact surface 76 moves the second piston 82 in the direction of arrow 84.

In some embodiments, the first piston 78 operates the hydraulic system of the clutch actuator 34 while the second piston 82 operates the hydraulic system of the brake actuator 38. In some embodiments, the first piston 78 is engaged by the first surface 74 before the second piston 82 is engaged by the second surface 76 as the operator moves the lever 32 toward the handlebars 18. Functionally, therefore, in some embodiments, the clutch 30 is disengaged from the transmission 28 prior to application of the brakes when the operator is trying to slow or stop the snow vehicle 10. Moreover, when the operator wishes to engage the clutch 30, the brakes have been released.

Figure 11:
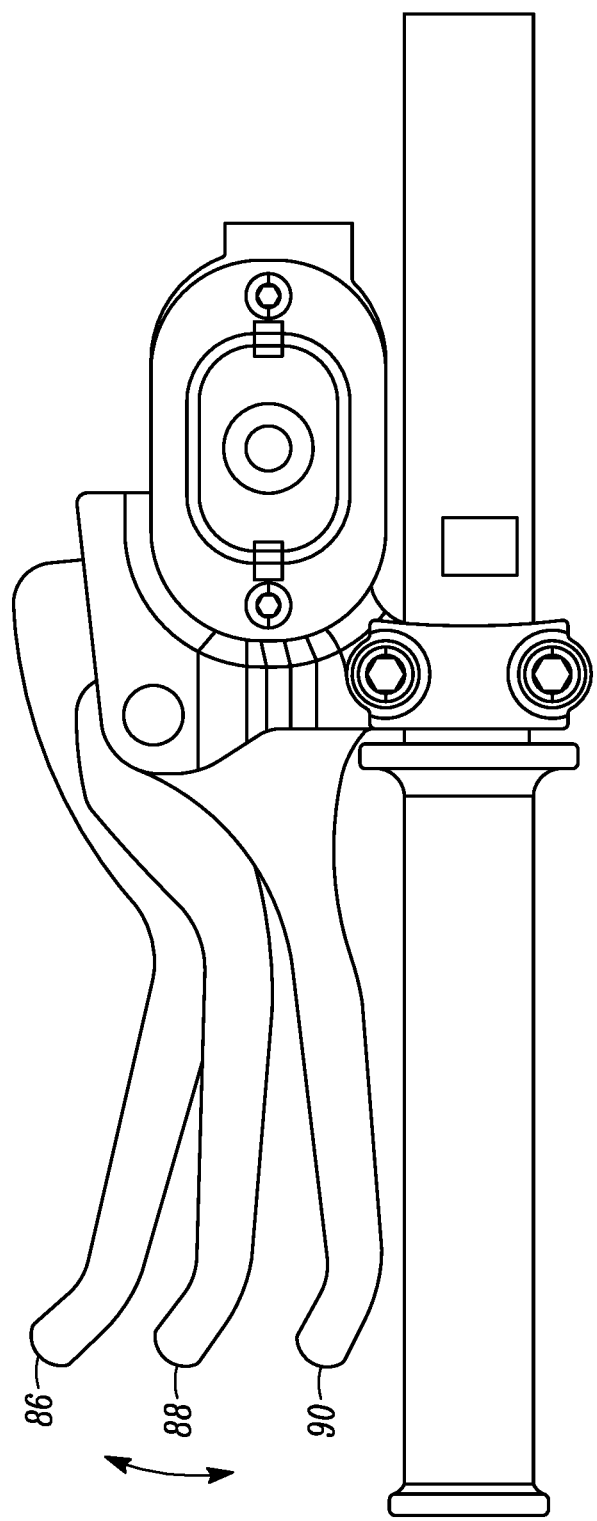
FIG. 11 shows a top view of an embodiment of an actuator assembly.

With regard to FIG. 11, in some embodiments, the lever 32 has a first position 86, a second position 88, and a third position 90. When the lever 32 is in the first position 86, the brake is disengaged (the brake disc 40 rotates freely) and the clutch 30 is engaged to the transmission 28 such that power can be transferred from the prime mover 14 to the track 16. When the lever 32 is in the second position 88, the clutch 30 is disengaged from the transmission 28 and the brake is disengaged. Finally, when the lever 32 is in the third position 90, the clutch 30 is disengaged from the transmission and the brake is engaged (the brake disc 40 no longer rotates freely). As will be appreciated, both the clutch actuator 34 and brake actuator 38 have degrees of actuation, such that the clutch 30 can be smoothly engaged and the brake can be applied as desired (e.g., minor braking or major braking).

Returning to FIG. 7, in some embodiments, when the lever 32 is in the first position, the first surface 74 is located more closely to the first piston 78 than the second surface 76 is located relative to the second piston 82. Stated differently, when the lever 32 is in the first position 86, the first surface 74 is separated from the first piston 78 by a distance A, where A is ≥0, and when the lever 32 is in the first position 86, the second surface 76 is separated from the second piston 82 by a distance B, wherein B is >A. Thus, in the first position 86, B>A≥0. It will be appreciated, that any other suitable arrangement can also be utilized. For example, where the first piston 86 and/or second piston 82 have portions extending toward the respective surfaces (74, 76) of the lever 32, the distances A and B can be measured with respect to extending portions, which may be intermediate of the respective piston and surface. Further, the first and second pistons 78, 82 can have protective covers extending thereover.

Returning to FIG. 8, in some embodiments, the first piston 78 can be in communication with a first hydraulic line 92 and the second piston 82 can be in communication with the second hydraulic line 94. In some embodiments, the first hydraulic line 92 is connected to the clutch actuator 34 and the second hydraulic line 94 is connected to the brake actuator 38.

Figure 9:
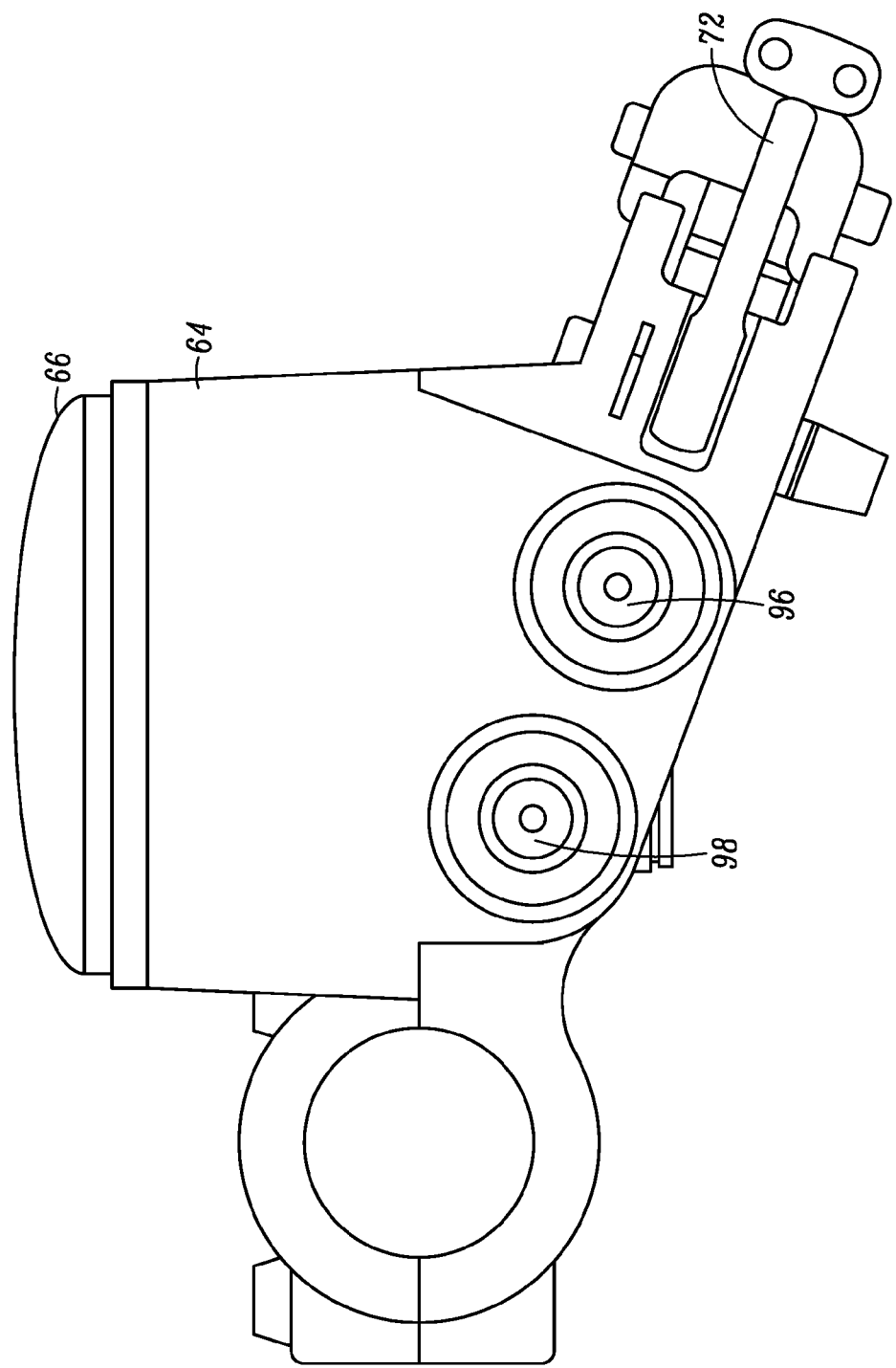
FIG. 9 shows a side view of an embodiment of the actuator assembly of FIG. 7.
Figure 10:
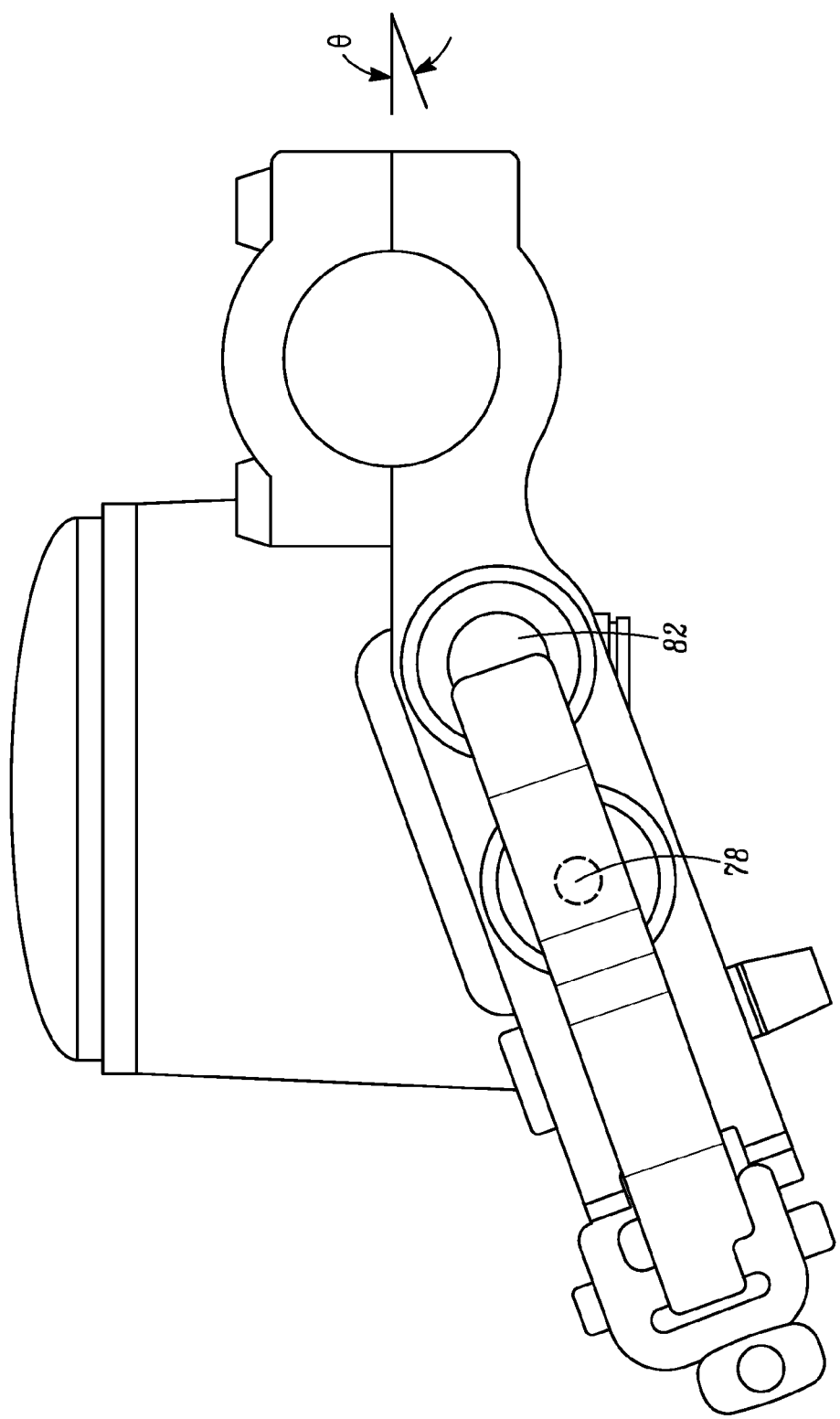
FIG. 10 shows a side view of an embodiment of the actuator assembly of FIG. 7.

As further shown in FIGS. 8 and 9, in some embodiments, the actuator assembly 29 has hydraulic ports 96, 98 to connect to the hydraulic lines (e.g., 92, 94). In some embodiments, the lever 32 is canted relative to the horizontal by an angle Θ (FIG. 10). This arrangement may provide improved ergonomics as compared to a lever 32 that moves horizontally.

In some embodiments, the actuator assembly 29 has a detent 112, which can be located on the lever 32 or the main body 62 so that the operator can feel when the lever is being moved from the first position 86 to the second position 88 or from the third position 90 to the second position 88. The detent 112 can interact with a ball (e.g., spherical bearing such as a ball bearing) with a spring (e.g., coil spring) to provide the operator with feedback about the position of the lever 32. In some embodiments, the lever 32 is formed from a single piece of material, such as aluminum.

Returning to FIG. 1, in some embodiments, the snow vehicle 10 further comprises a foot brake 100, which can be used in conjunction with or in lieu of the lever 32 to actuate the brake actuator 38. Although the foot brake 100 is shown on the left hand side, it will be appreciated that the foot brake 100 can be located on either side of the snow vehicle 10.

In some embodiments, the snow vehicle 10 comprises a rear brake light 102, hand warmers, and/or thumb warmers, and a front headlight 103.

In some embodiments, the snow vehicle 10 has a front shroud 104, which can shield the engine and componentry from snow. It can also help shield the operator from terrain and cold air passing by the operator as the snow vehicle is ridden.

Figure 12:
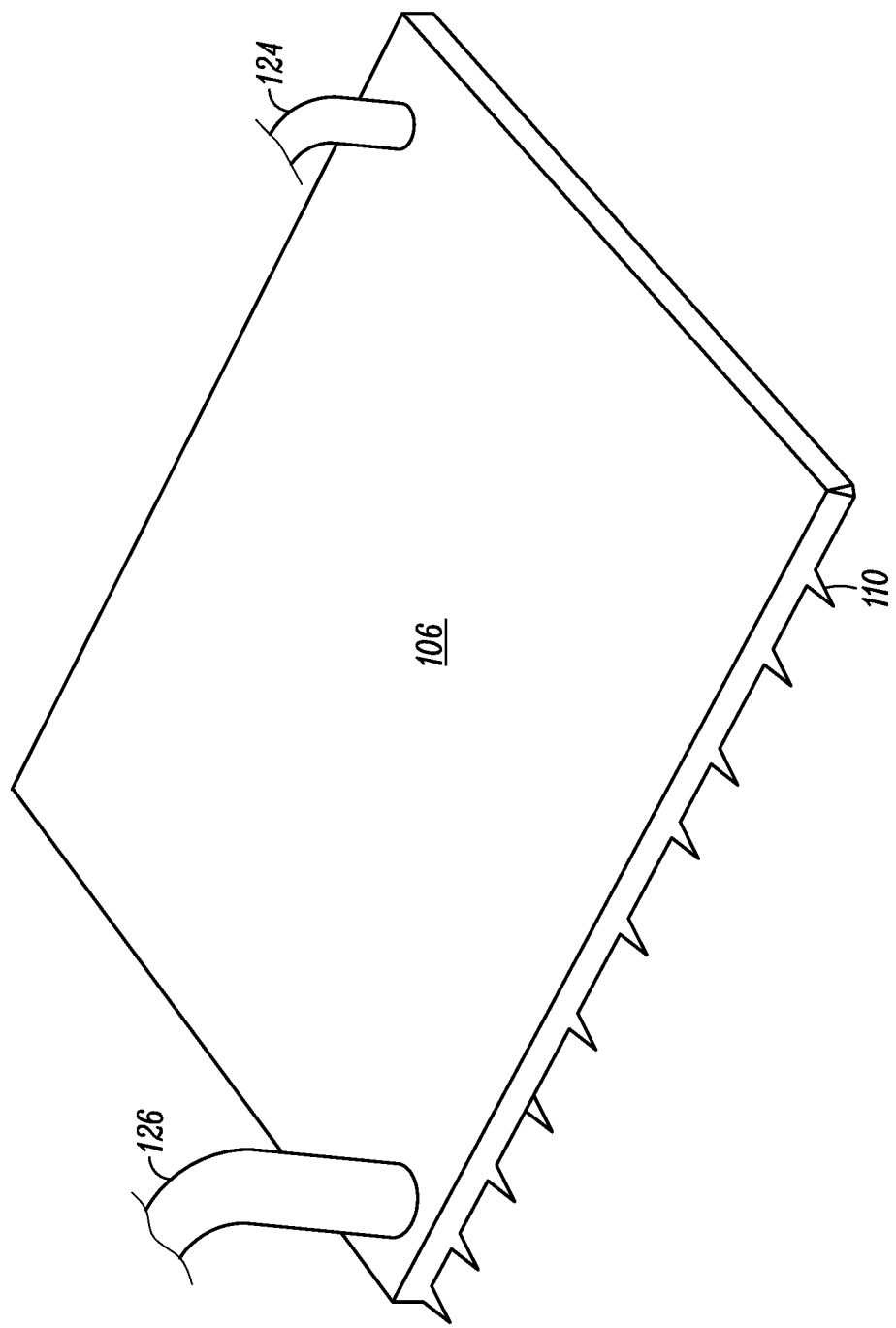
FIG. 12 shows an embodiment of a heat exchanger.

In some embodiments, the snow vehicle 10 comprises a heat exchanger 106. The heat exchanger 106 can be used in lieu of or in addition to a radiator to cool the engine. In some embodiments, the snow vehicle 10 comprises a track frame 108 to which the heat exchanger 106 is attached. The heat exchange 106 can extend along the entire distance of track frame 108 or it can extend along only a portion of the track frame 108. In some embodiments, the heat exchanger 106 is located above the track 16. The heat exchanger 106 can be formed from any suitable material, such as aluminum. Further, the heat exchanger 106 can include a plurality of fins 110 (see FIG. 12) to dissipate heat from the coolant flowing through the heat exchanger 106.

Figure 13:
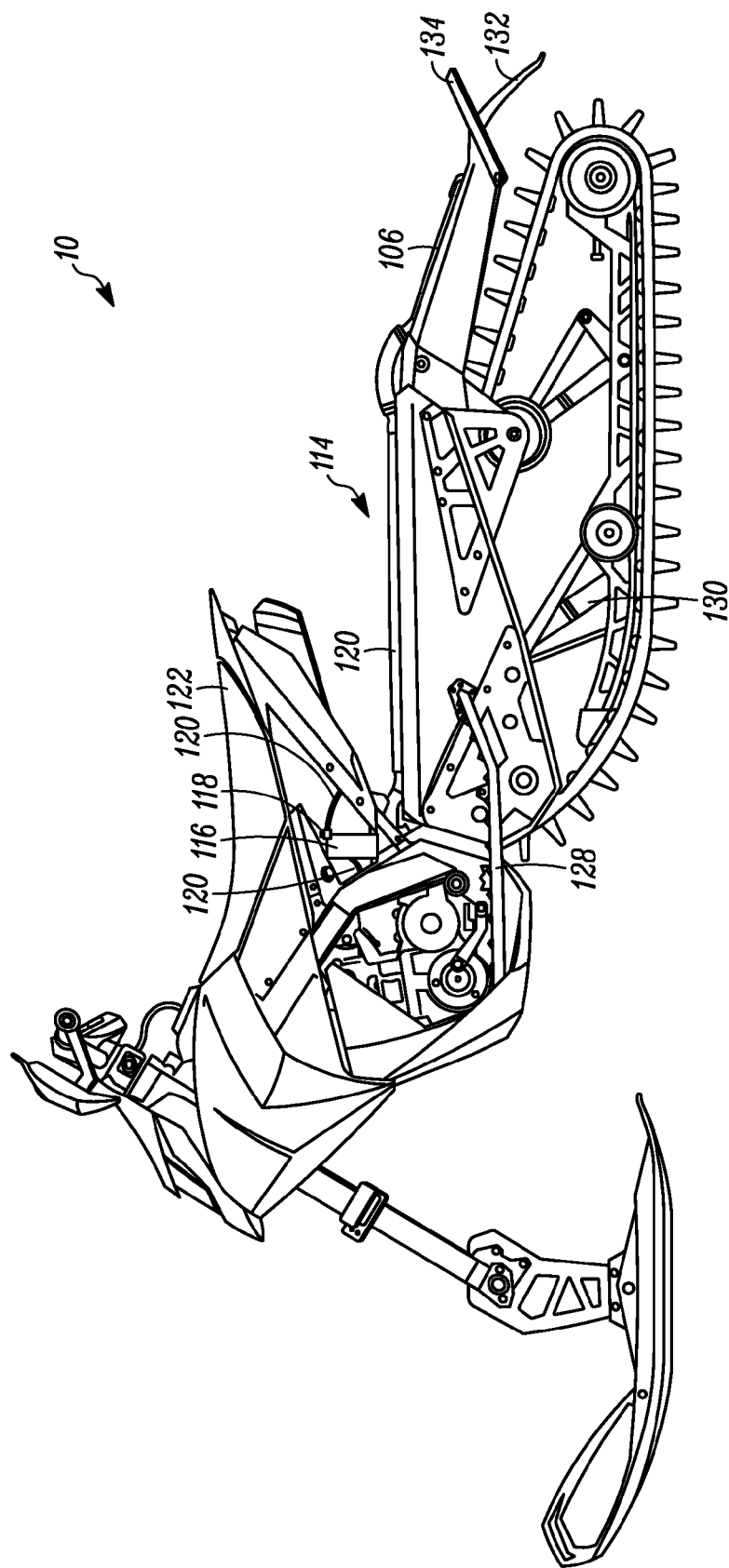
FIG. 13 shows an embodiment of a snow vehicle having a cooling system.

In some embodiments, the snow vehicle 10 further includes a cooling system 114 having a coolant tank 116, shown in FIG. 13, a cap 118, and coolant lines 120 extending between the engine, coolant tank 116, and heat exchanger 116. In some examples, at least some of the coolant lines 120 extend outside of the track frame 108. In some examples, however, at least some of the coolant lines 120 extend interiorly to the track frame 108. Further, in some examples, the coolant tank is located below the operator's seat 122 but above the heat exchanger 106. In some examples, the coolant tank 116 is located above the top of the track frame 108. In some examples, the coolant tank is located above the operator's seat 122.

Returning to FIG. 12, the heat exchanger 106 has an intake fitting 124 and a return fitting 126. The fittings 124, 126 can be arranged in any suitable configuration.

In some embodiments, the heat exchanger 106 comprises a portion of the track frame 108 and provides stiffness to the track frame 108. Stated differently, in some embodiments, the heat exchanger 106 can also serve as a structural member, thereby reducing the amount of structure of the track frame 108 and providing a lighter snow vehicle 10.

The snow vehicle 10 further comprises foot rests 128 (see FIG. 13), which can be located on one or both sides of the snow vehicle 10. Moreover, in some embodiments, the track frame 108 is attached to the main frame 12 with a swing arm having a coil spring. Or, the track frame 108 can be attached to the main frame 12 via a rigid strut. Or, the track frame 108 can be attached to the main frame via a torsion spring, an elastomeric member, or in any other suitable configuration. Further still, the track frame 108 can have internal suspension members 130, which can be used independently or in conjunction with suspension between the track frame 108 and the main frame 12. In some embodiments, the snow vehicle 10 has a rear flap 132 for deflecting snow; in some embodiments, the snow vehicle 10 has a lift handle 134, which can be used to lift a rear end of the snow vehicle 10.

Figure 14:
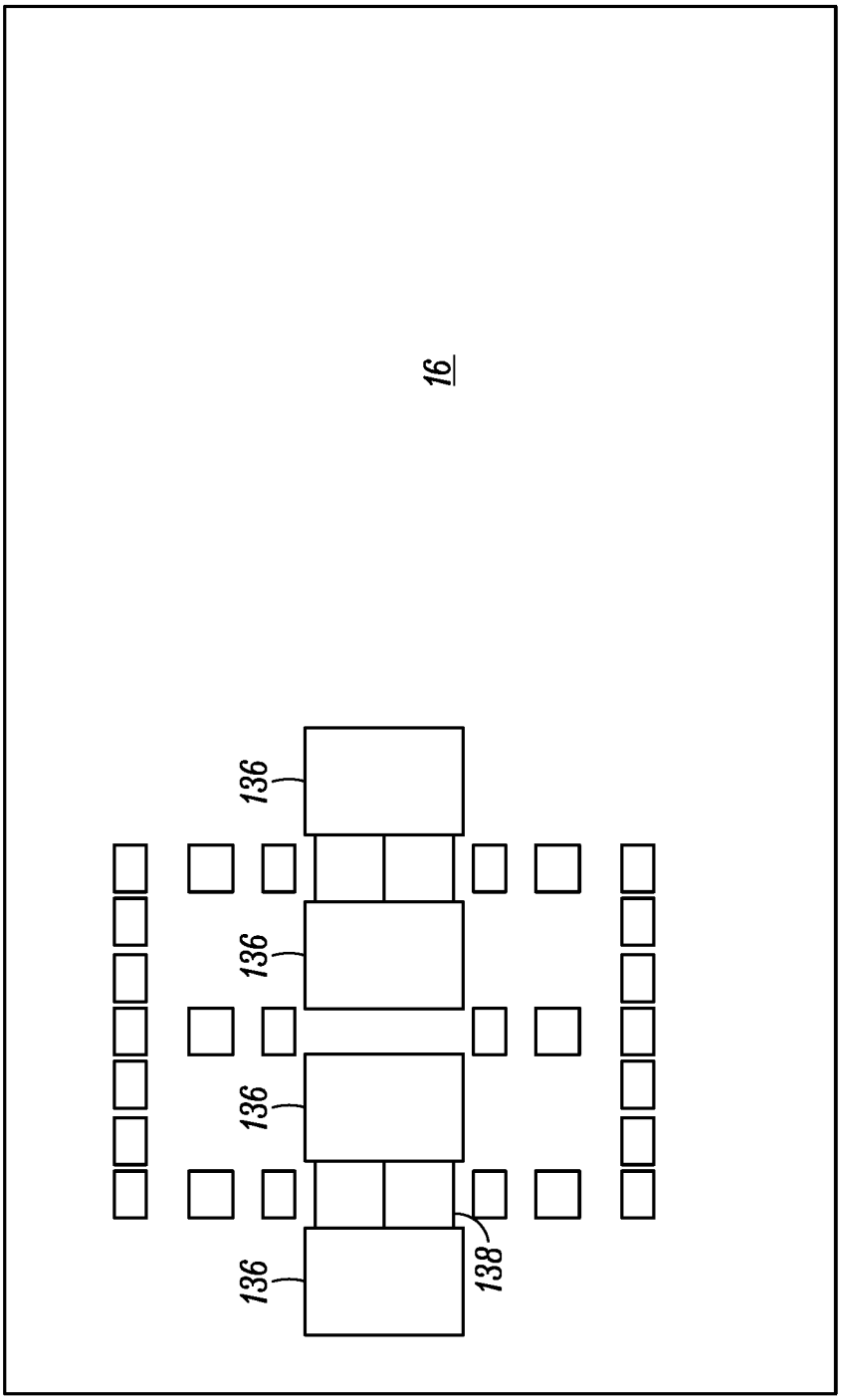
FIG. 14 shows a partial view of an inside of an embodiment of a track 16.
Figure 15A:
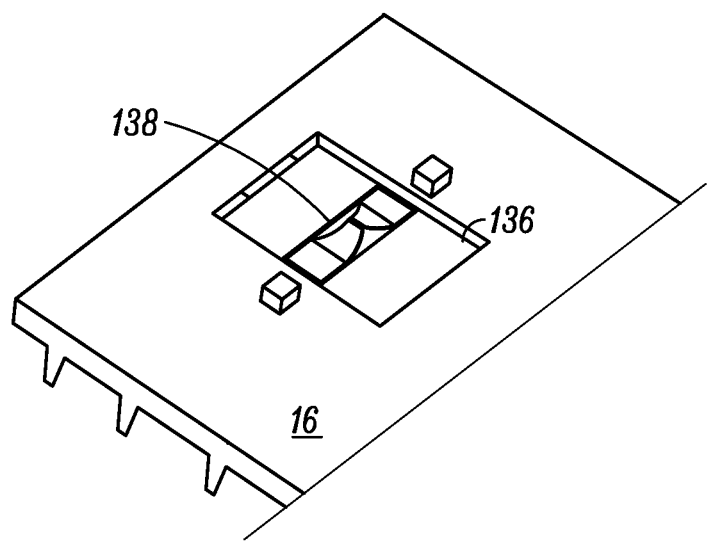
FIGS. 15A-15C show view of an embodiment of a track clip.
Figure 15B:
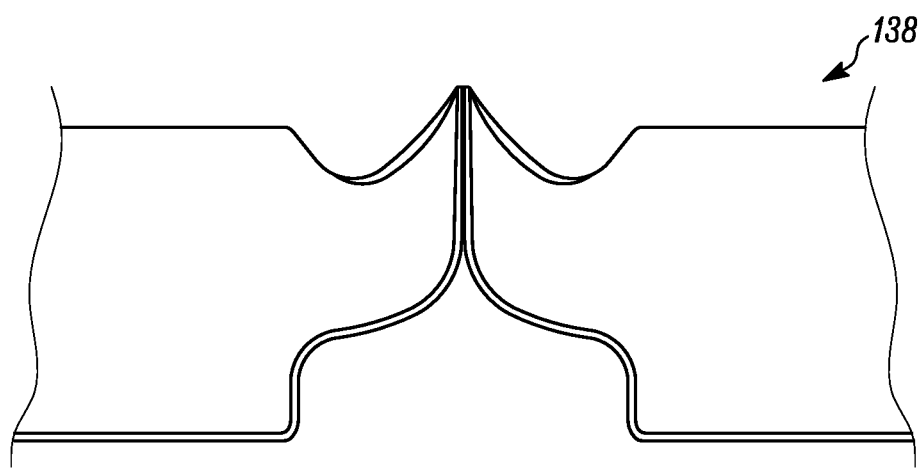
Figure 15C:
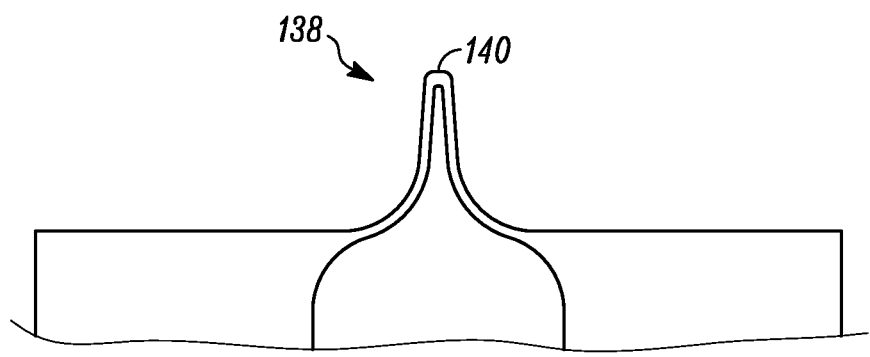

With regard to FIG. 14, an interior of a portion of a track 16 is shown. The track 16 has a plurality of windows 136 and a plurality of track clips 138. As further shown in FIGS. 15A-C, in some embodiments, the track clips 138 have a protruding center portion 140 which extends inwardly toward the interior of the track 16. In some embodiments, the track clips 138 and windows 136 are located along the centerline of the track 16.

Figure 16:
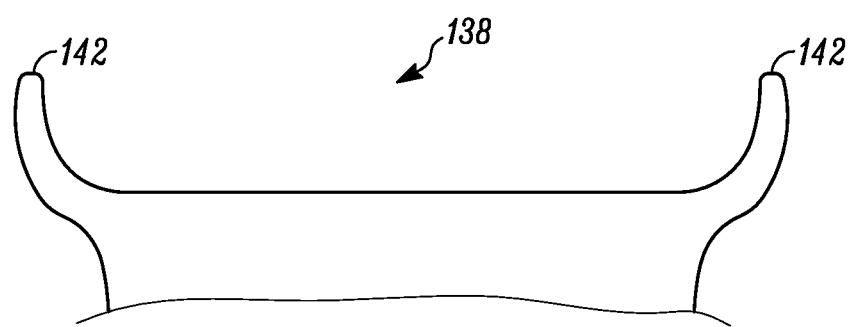
FIG. 16 shows a front view of another embodiment of a track clip.

In some embodiments, as show in FIG. 16, the track clips 138 protruding portions 142 at opposing ends of the track clip 138. Such track clips 138, whether having protruding portions 142 at opposing ends of the track clip 138 or a protruding center portion 140 are believed to reduce the possibility of a track derailment, especially in conditions where the snow vehicle 10 is traversing a path perpendicular to an incline (e.g., "side hilling").

Figure 17:
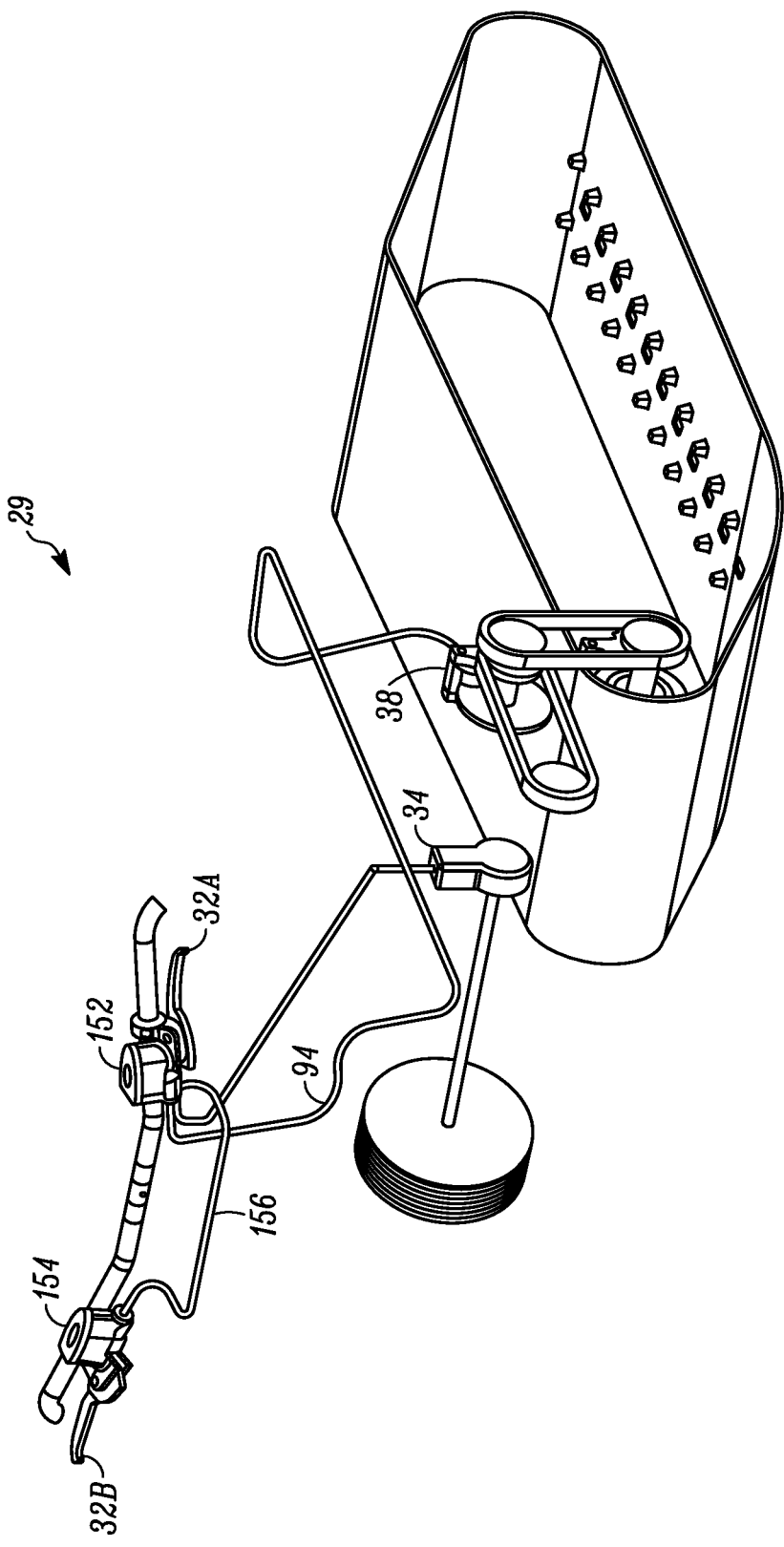
FIG. 17 shows an embodiment of a snow vehicle, including an actuator assembly.

Turning to FIGS. 17-20, in some embodiments, the snow vehicle 10 includes an actuator assembly 29. In some embodiments, the actuator assembly 29 includes a first lever 32a and a second lever 32b. In some embodiments, the first lever 32a actuates both the clutch actuator 34 and the brake actuator 38, as previously discussed herein. As shown in FIG. 17, in some embodiments, the second lever 32b actuates the brake actuator 38. The second lever 32b may not be linked to the clutch actuator 34 such that upon squeezing the second lever 32b, the brake actuator 38 is actuated but the clutch actuator 34 is not actuated, regardless of how far the second lever 32b is squeezed. Stated differently, in some embodiments, the second lever 32b is tied only to the brake actuator 38 and is not tied to the clutch actuator 34.

As further shown in FIG. 17, in some embodiments, the snow vehicle 10 has a first master cylinder 152 and a second master cylinder 154. The first master cylinder 152 and the second master cylinder 154 can include hydraulic fluid common to both master cylinders 152, 154. In some embodiments, the first master cylinder 152 includes two pistons (e.g., 78, 82) as previously described with respect to FIG. 8. Further, in some embodiments, the second master cylinder 154 has a single piston which is fluidly connected to a third hydraulic line 156. In turn, and with regard to FIGS. 18 and 19, the third hydraulic line 156 fluidly connects the second master cylinder 152 to the second piston 82 (FIG. 8; e.g., brake piston) so as to actuate the brake actuator 38 as the second lever 32b is actuated. In this way, the brake actuator 38 can be actuated by either the right hand brake (e.g., 32a) or the left hand brake (e.g., 32b).

Figure 18:
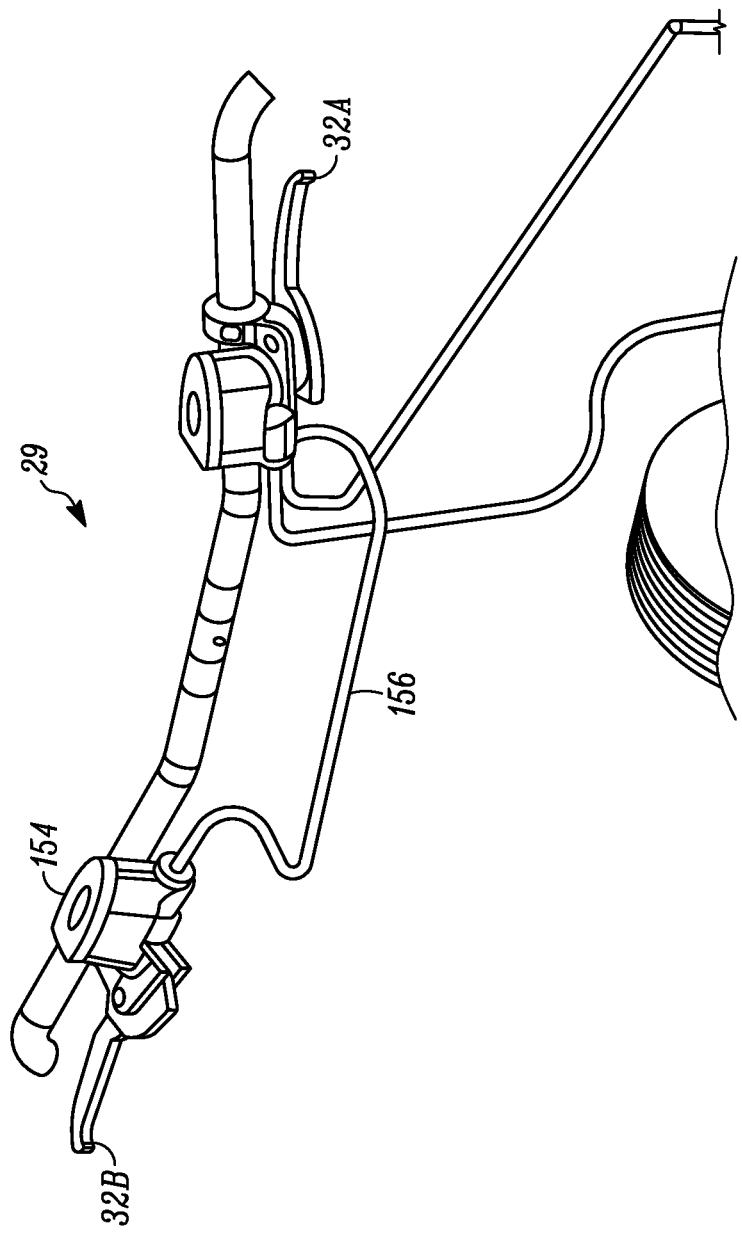
FIG. 18 shows a portion of an embodiment of the actuator assembly of FIG. 17.
Figure 19:
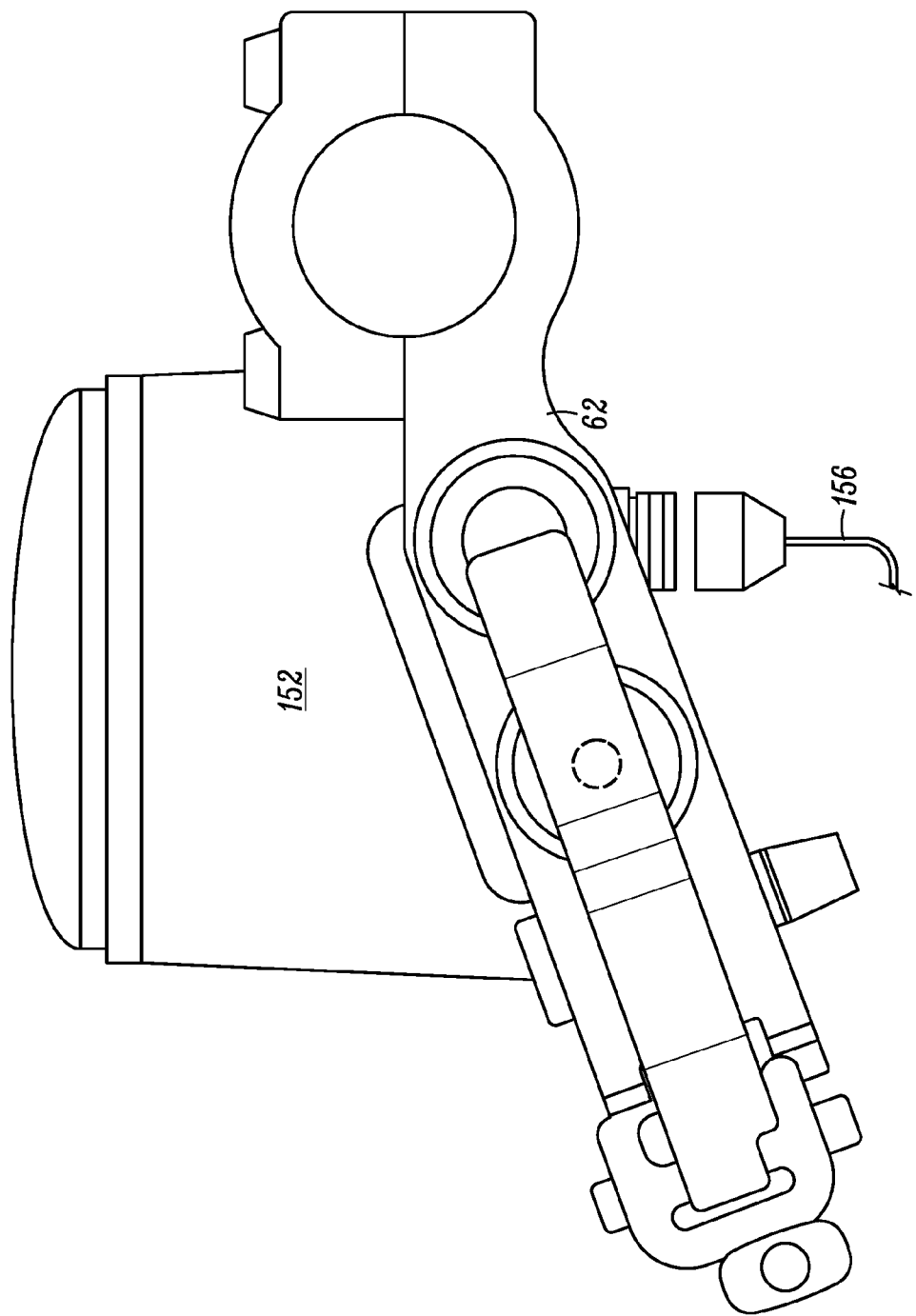
FIG. 19 shows a side view of an embodiment of an actuator assembly of FIG. 17.

Although shown in FIGS. 17-19 with a hydraulic system, the levers 32a and 32b can also be tied to mechanical systems (e.g., cables), as previously discussed.

Figure 20:
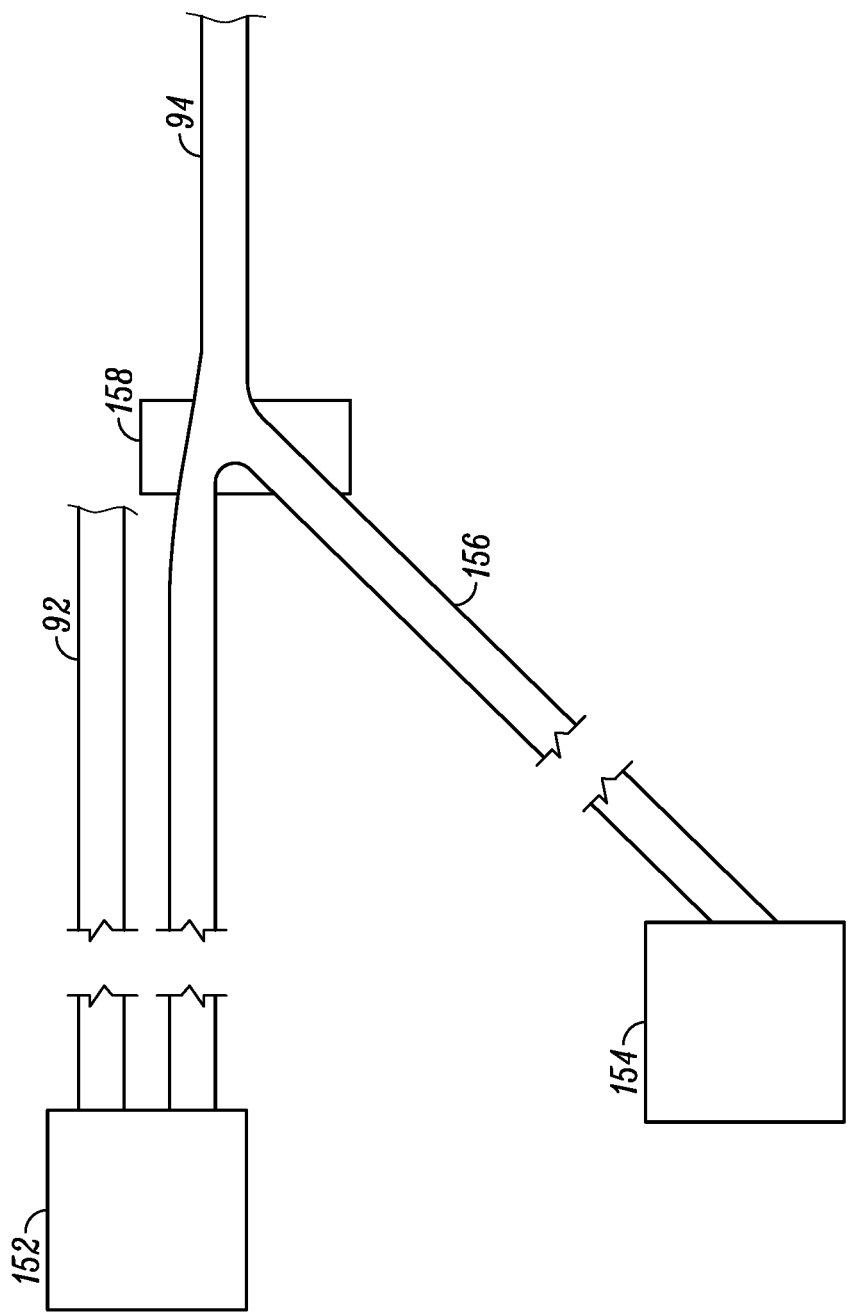
FIG. 20 shows a partial schematic of a hydraulic system.

With regard to FIG. 19, in some embodiments, the third hydraulic line 156 is coupled to the main body 62. In some embodiments, however, the third hydraulic line 156 can be coupled to a second hydraulic line 94, as shown in FIG. 20, for example with a fitting 158 (e.g., Y-connector) in the hydraulic line. In this way, the third hydraulic line 156 intersects the second hydraulic line 94 outside or downstream of the main body 62. As will be appreciated, other arrangements are possible.

In some embodiments, only one of the levers 32a or 32b has a parking brake lock 68. In some embodiments, however, both levers 32a and 32b have a parking brake lock. Further, in some embodiments, actuation of either of the of the levers 32a and 32b turns on the brake light 102. Further still, in some embodiments, the snow vehicle 10 comprises a foot brake (discussed previously) that is also tied into the hydraulic system to actuate the brake actuator 38. In this way, the snow vehicle 10 can have one, two, or three master cylinders, each of which can be actuated to operate the brake actuator 38. Moreover, upon actuation of the foot brake 100, the brake light 102 can turn on.

Figure 21:
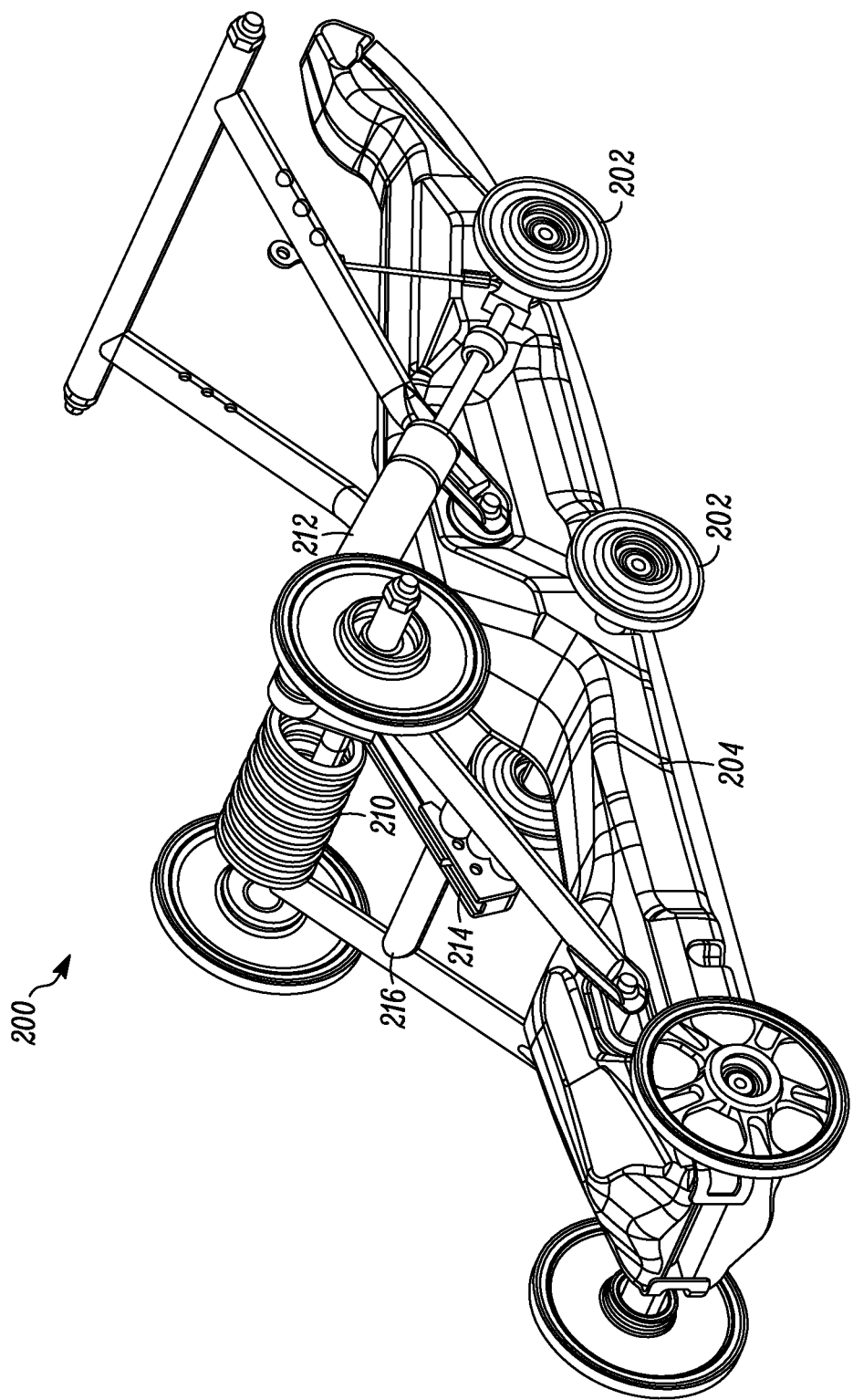
FIG. 21 shows an embodiment of a skid frame assembly.
Figure 22:
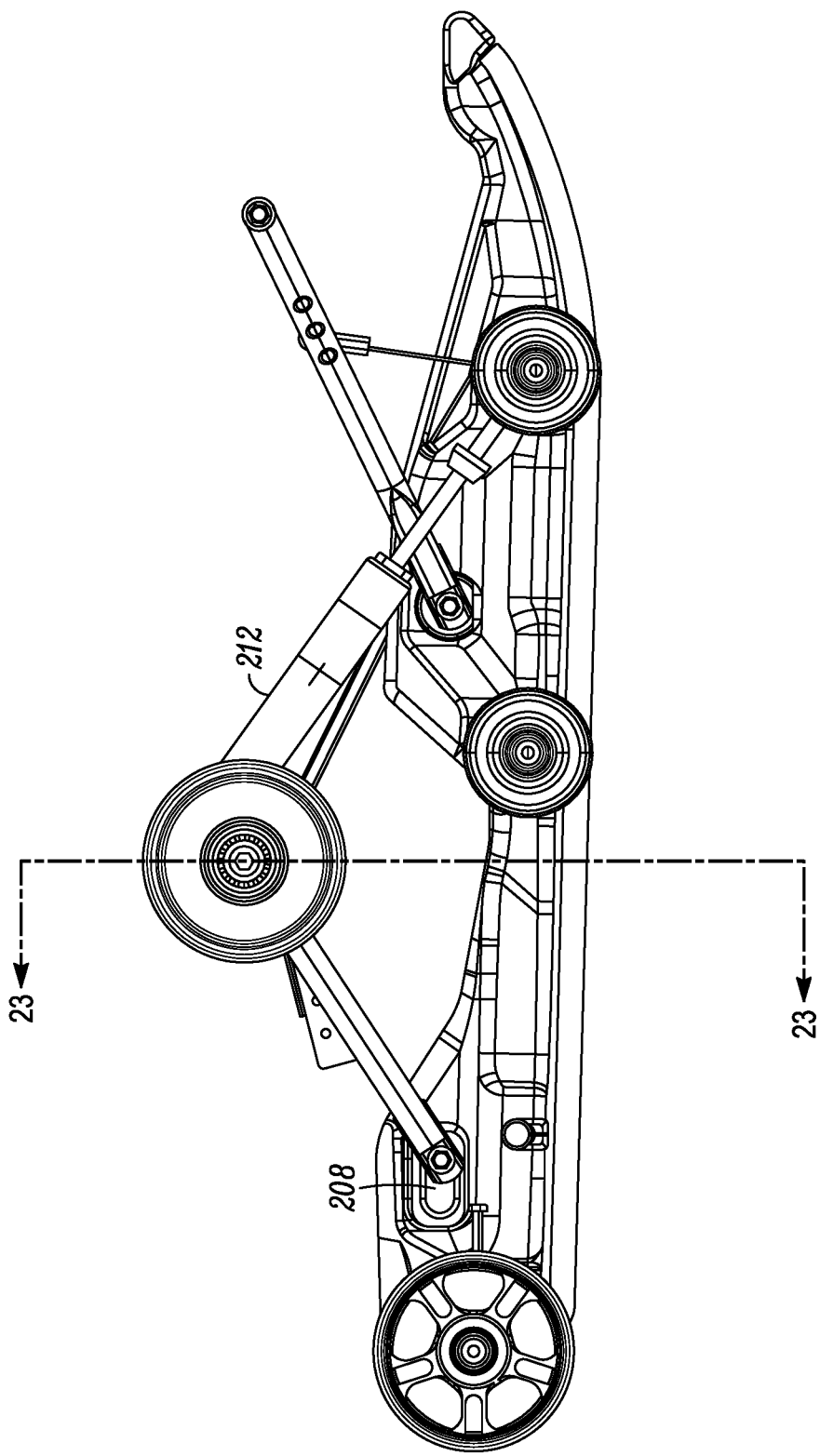
FIG. 22 shows a side view of the embodiment of the skid frame assembly of FIG. 21.
Figure 23:
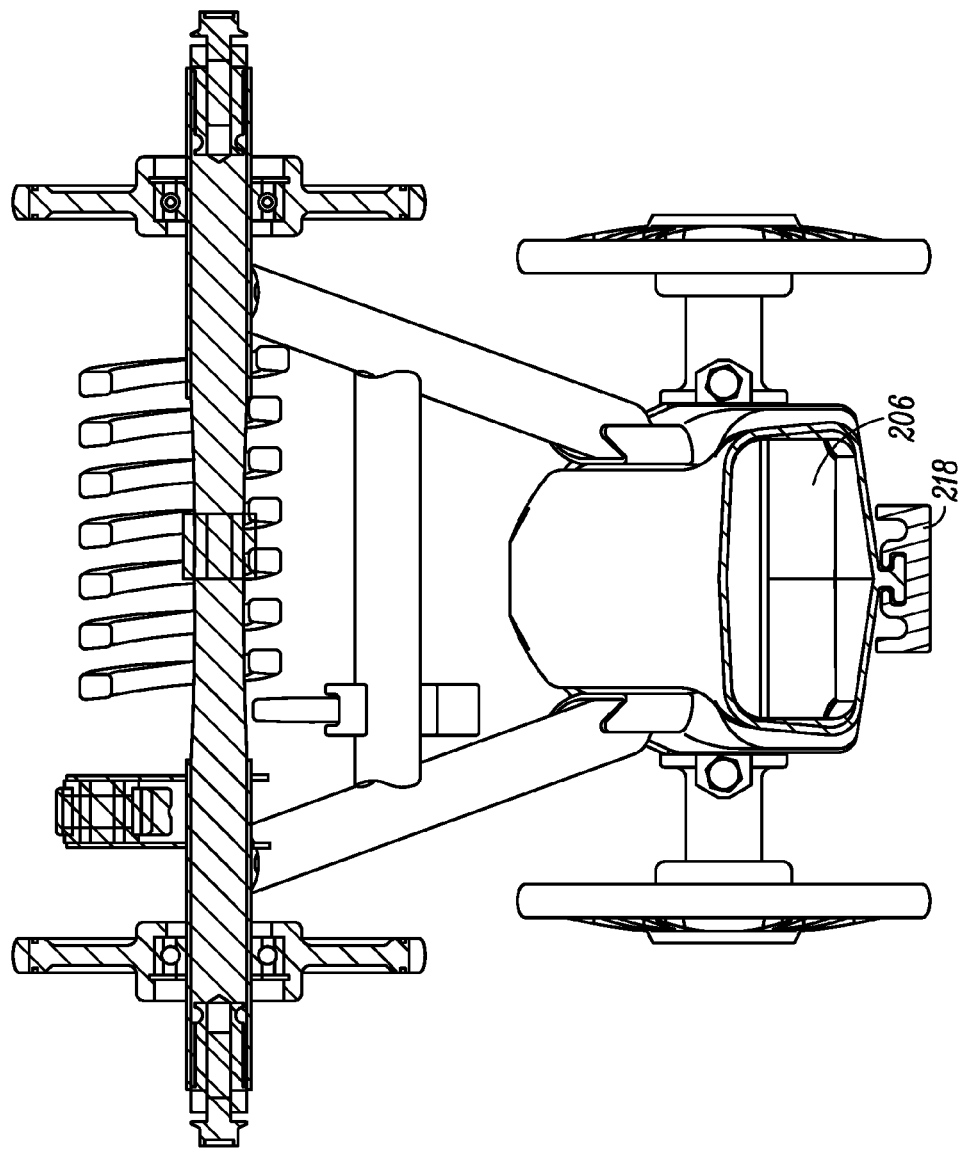
FIG. 23 shows a cross sectional view of the embodiment of the skid frame assembly of FIG. 22.

Turning to FIGS. 21-23, in some embodiments, the snow vehicle 10 comprises a skid frame assembly 200. The skid frame assembly 200 can include a plurality of bogey wheels 202, which are spaced from and along the length of a skid rail 204. In some embodiments, the snow vehicle 10 includes a single skid rail 204 which is located along the longitudinal centerline of the snow vehicle 10, as illustrated for example in FIGS. 2 and 3, as the skid rail 204 works in conjunction with the track 16. In some embodiments, the skid rail 204 comprises a hollow portion 206, as shown for example in FIG. 23. In some embodiments, the skid rail 204 is blow molded, though it can be formed in other ways; for example, the skid rail 204 can be formed from an extrusion, for example of aluminum or plastic. In some embodiments, the snow vehicle 10 utilizes an embodiment of the suspension shown in U.S. Pub. No. 2015/0166143, having inventor Andrew Beavis and application Ser. No. 14/109,760, which is herein incorporated by reference in its entirety. Further, components disclosed in U.S. Pub. No. 2015/0166143 can also be used in conjunction with the snow vehicle 10.

In some embodiments, the skid frame assembly 200 includes a slider joint 208. In some embodiments, the skid frame assembly 200 includes a spring 210 (e.g., torsion spring or coil spring) and a damper 212. Further, the spring 210 is coupled to an adjuster 214 that can be moved relative to cross beam 216 so that the suspension can be adjusted, for example by providing a greater or lesser degree of pretension.

With regard to FIG. 23, in some embodiments, skid frame assembly 200 further includes a wear strip 218 (e.g., Hyfax) which can be replaced and which contacts a portion of the track clips 138 (e.g., FIG. 16).

Figure 24:
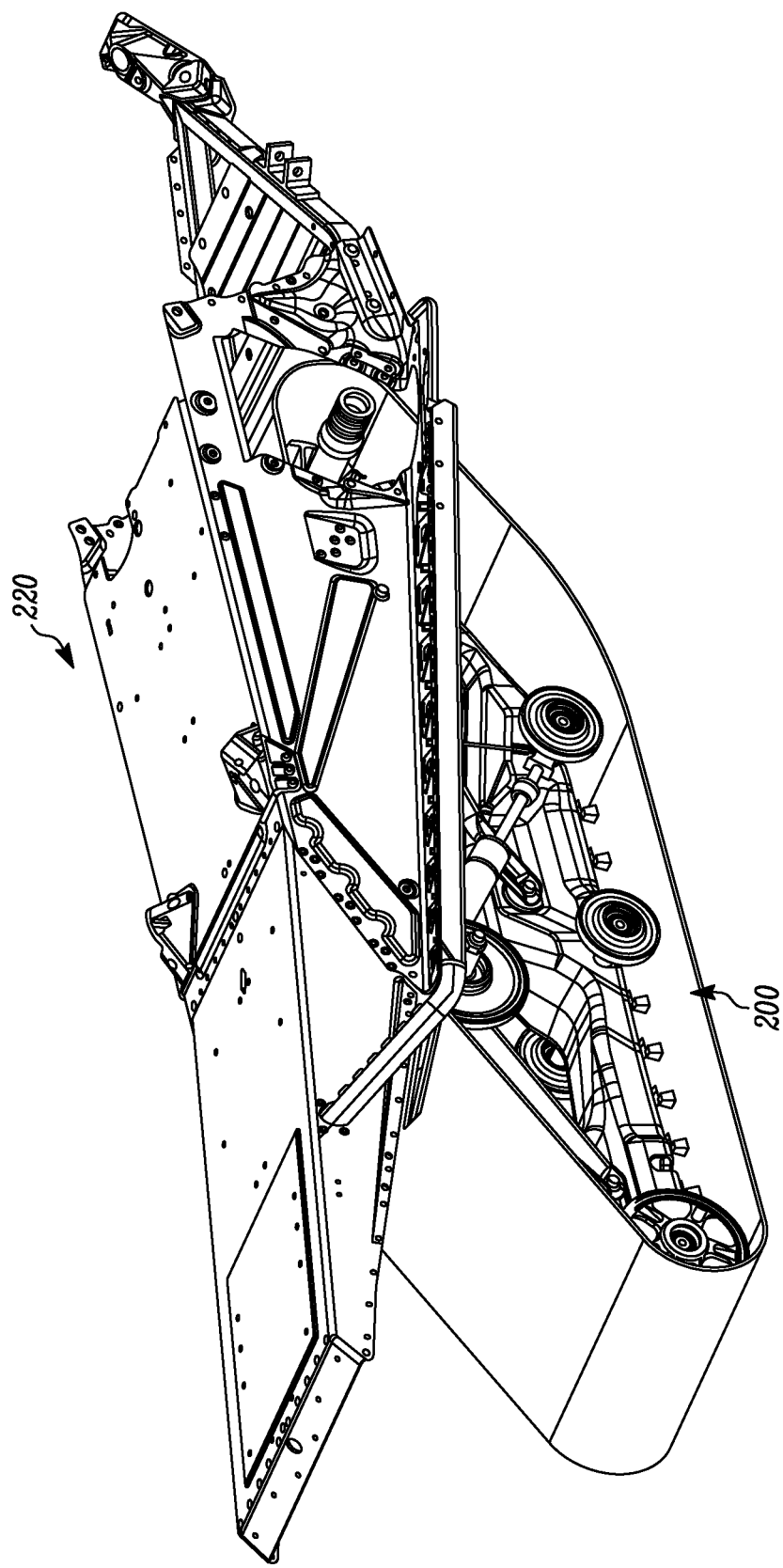
FIG. 24 shows an embodiment of a tunnel and skid frame assembly.
Figure 25:
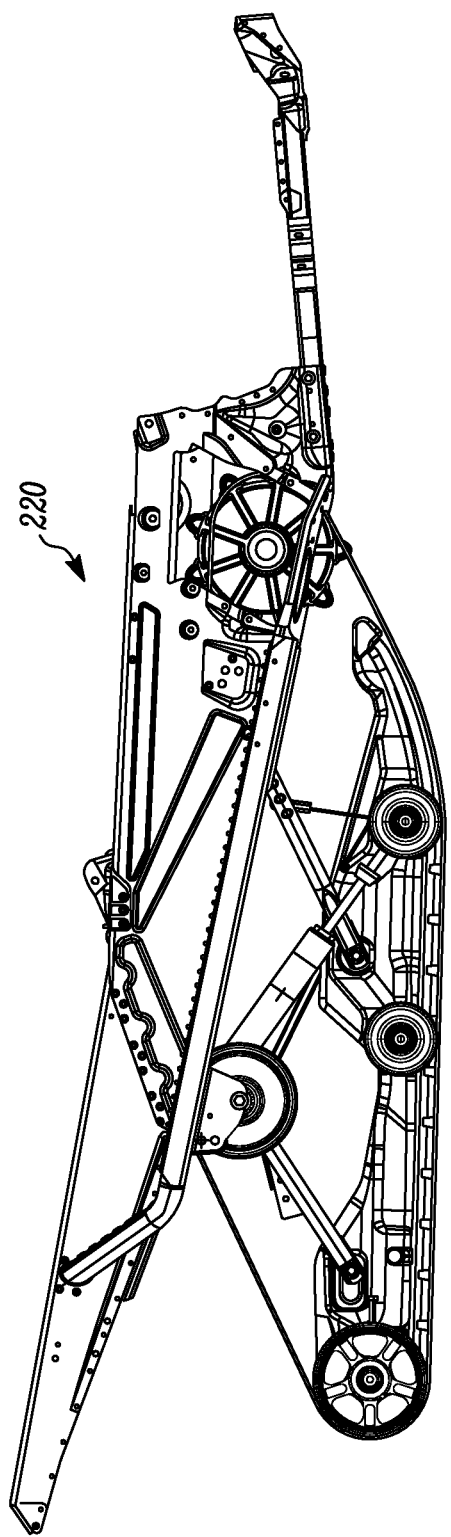
FIG. 25 shows a side view of the embodiment of the tunnel and skid frame assembly of FIG. 24.

Turning to FIGS. 24 and 25, it will be appreciated that the skid frame assembly 200 can also be coupled to a tunnel 220. The tunnel 220 can be formed from any suitable material, for example aluminum or plastic. Further, the skid frame assembly 200 can be used with any desired variety of snowmobile (e.g., 2017 Arctic Cat® M) or "snow bike"; another suitable snow vehicle is Arctic Cat's SVX 450.

Figure 26:
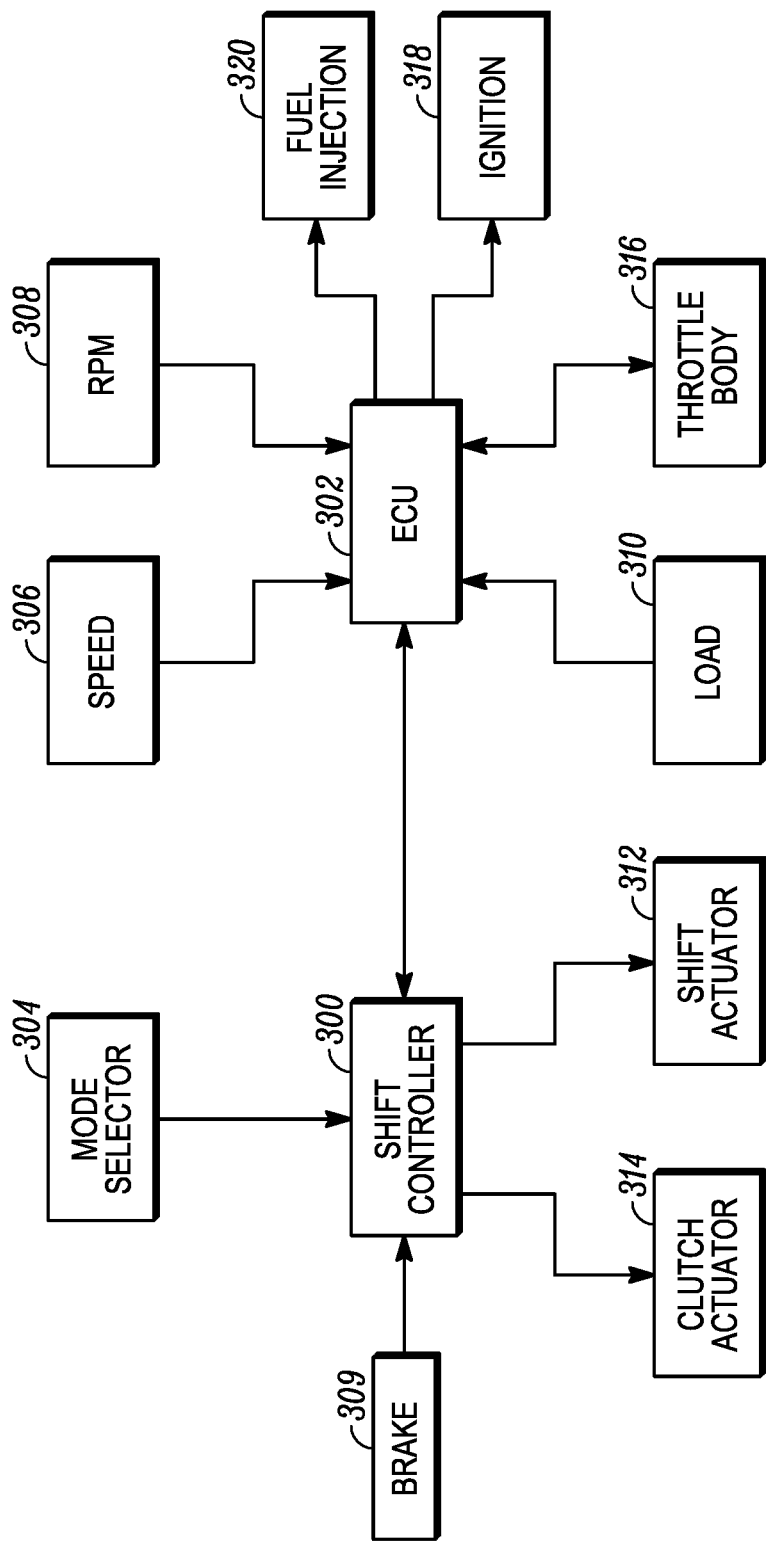
FIGS. 26 and 27 show schematics of controller configurations for operation of the snow vehicle 10.

With regard to FIG. 26, in some embodiments, the transmission 28 utilizes a shift controller 300. The shift controller 300 can be a separate unit which may be dedicated to controlling functionality of the transmission 28. In some embodiments, however, the shift controller 300 is combined with the controller 302 (e.g., engine control unit (ECU)); in some embodiments, however, the shift controller 300 and controller (e.g., ECU) are separate. In some embodiments, the shift controller 300 is in communication with the controller 302 (e.g., ECU) such that the shift controller 300 and controller 300 share information which one another about status of various systems of the snow vehicle 10.

As further shown in FIG. 26, in some embodiments, the shift controller 300 can receive information from one or more onboard sources. For example, in some embodiments, a mode selector 304 can instruct the shift controller 300, for example, to operate in manual or automatic modes, as discussed in greater detail below. Further, the controller 302 (e.g., ECU) can receive inputs from one or more sources, such as vehicle speed sensor 306 (e.g., track speed sensor), engine speed sensor 308, engine load calculator 310, and shift controller 300. In turn, the controller 302 can, in response to one or more conditions (e.g., vehicle speed sensor 306, engine speed sensor 308, etc.), the controller 302 can control, in combination with shift controller 300, one or more vehicle functionalities, such as shift actuator 312, clutch actuator 314, throttle body position 316, ignition timing 318, and fuel injection 320 (e.g., fuel map). In some embodiments, the shift controller 300 signals the shift actuator 312 and clutch actuator 314 to shift gears of the vehicle based on information gathered from one or more of the various input sources. By way of example, in some embodiments, if the snow vehicle 10 is in a low range forward gear (e.g., first gear) and the ECU determines that the RPM is above a threshold level and the load is below a threshold level, the shift controller 300 will instruct the clutch actuator 314 to actuate the clutch. During actuation of the clutch, in order to prevent over-revving of the engine, the ECU will instruct the fuel injection system to reduce fuel to the engine and/or change when, during the engine cycle, fuel is input into the cylinder. As the clutch is actuated, the shift controller 300 will instruct the shift actuator 312 to shift to the next desired gear (e.g., $2^{nd}$ gear). Thereafter, the shift controller 300 will instruct the clutch actuator 314 to "let out" the clutch and the ECU will instruct the fuel injection system to increase fuel supplied to the engine, or as otherwise called-for by the operator.

In some embodiments, the shift controller 300 will instruct the clutch actuator 314 to disengage and reengage with every shift. In some embodiments, however, the clutch actuator 314 will only disengage and reengage in some shifts and depending upon shift mode (as discussed in greater detail with respect to FIG. 28). For example, where there transmission is a sequential manual gearbox (SMG), it may not be necessary to disengage/reengage the clutch between some or all gears. Again by way of example, if the mode selector 304 is set to race mode (indicated by race mode light 328 in FIG. 28), shifting between forward gears may be conducted without actuation of the clutch actuator 314. In other modes, however, the clutch actuator 314 may be utilized upon shifting. Further still, in some embodiments, the clutch actuator 314 may not be present at all. Again, by way of example, where an SMG transmission is utilized, a hand clutch (as discussed previously) can be used to start-off in first gear only and, thereafter, the shift actuator 312 performs shifts without disengaging/reengaging the clutch. Of course, the aforementioned examples are merely that—examples—and the shift controller 300 can perform shifts in any appropriate way.

With further reference to FIG. 26, some of onboard information sources and/or vehicle functionalities (e.g., 304, 306, 308, 310, 312, 314, 316, 318, 320) can both receive information from the shift controller 300 and send information to the shift controller 300. For example, in some embodiments, one or both of the clutch actuator 314 and shift actuator 312 receive signals from the shift controller 300 to perform their function and, additionally, send signals to the shift controller 300 (or controller 302) to monitor the state of the clutch actuator 314 and/or shift actuator 312. This bi-directional relationship also be the case for any of the onboard information sources and/or vehicle functionalities.

Figure 27:
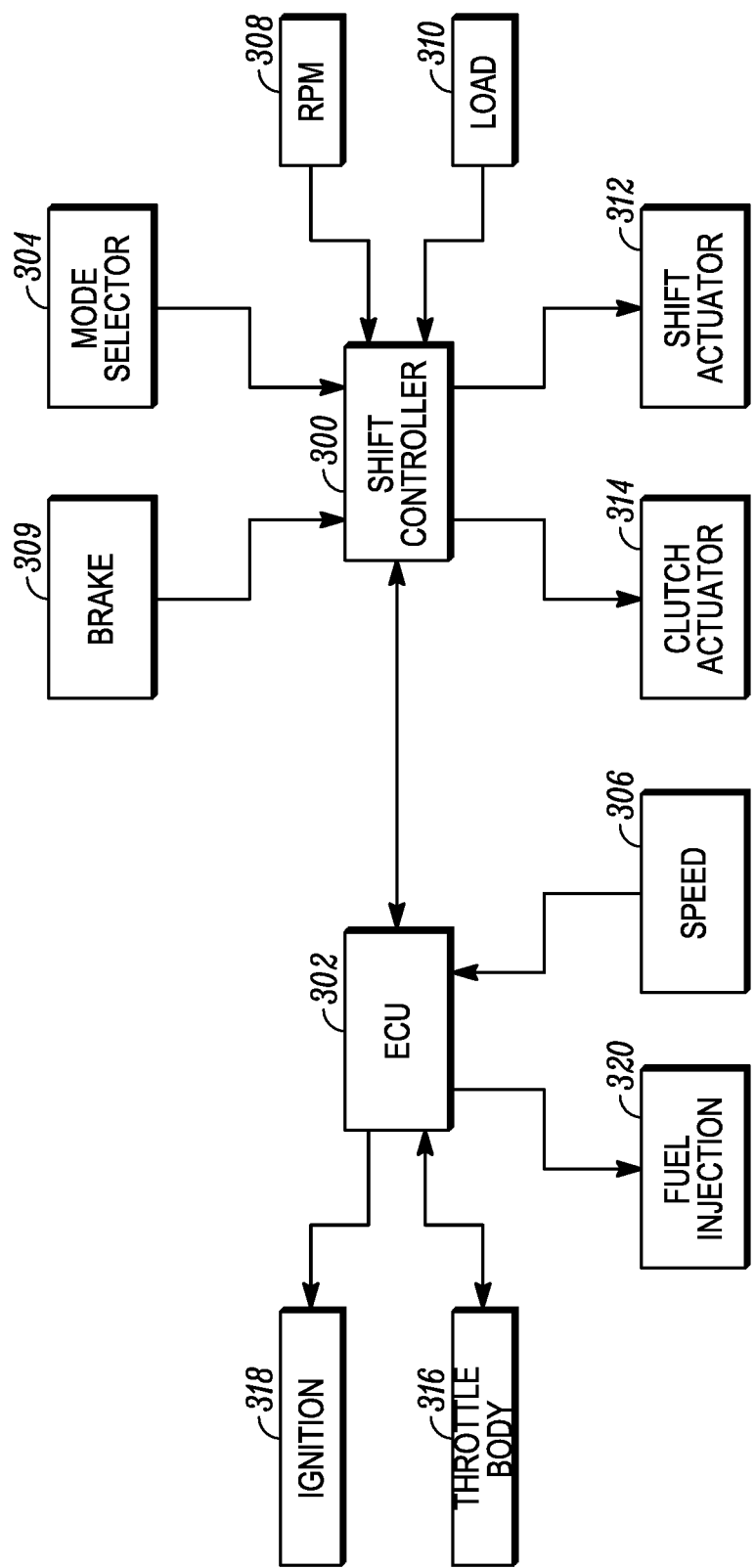

Another example of a schematic is shown in FIG. 27, illustrating that functionalities and/or onboard information sources can be tied directly with the shift controller (e.g., engine load calculator 310, engine speed sensor 308). The schematic is illustrative, and the controller 302 can be combined with the shift controller 300 such that separate controllers are unnecessary. In some embodiments, the shift controller 300 includes an input from a brake sensor 309.

In some embodiments, the clutch actuator 314 is a linear actuator, solenoid, rotary actuator, stepper motor, etc. Further, in some embodiments, the shift actuator 312 is a linear actuator, solenoid, rotary actuator, stepper motor, etc. In some embodiments, the shift actuator 312 is coupled to a shift drum to shift gears.

Figure 28:
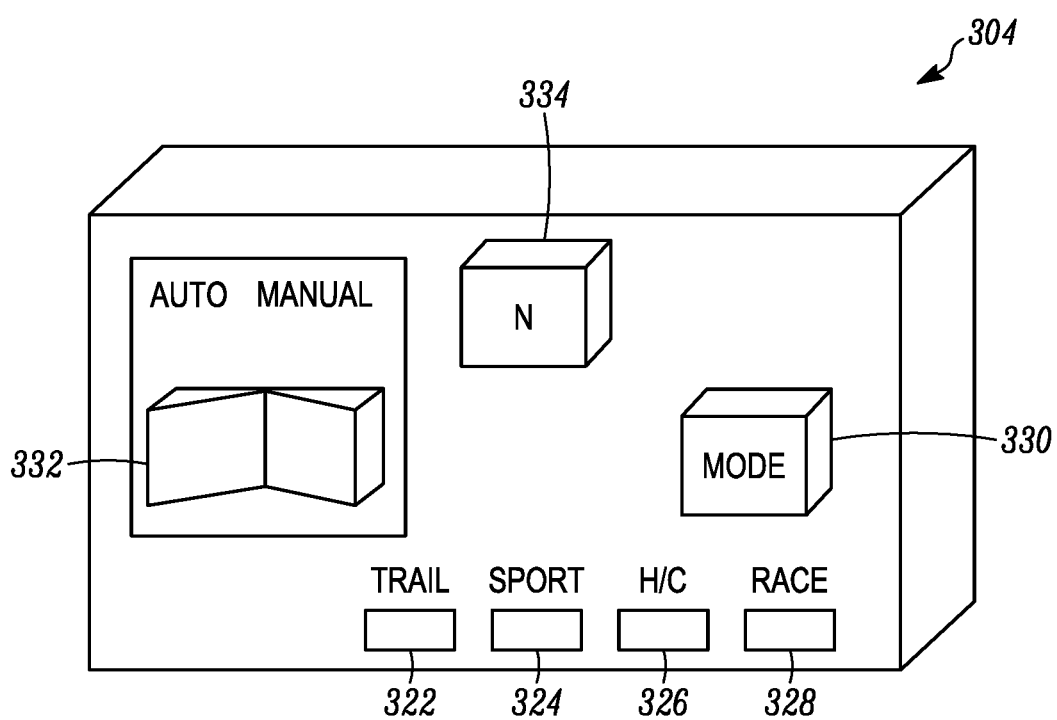
FIG. 28 shows an embodiment of a mode selector for selecting various modes of operation.

Turning to FIG. 28, an example of a mode selector 304 is shown. In some embodiments, the mode selector 304 is mounted to the handlebars 18 (shown in FIG. 1) or display area so that it can be easily viewed and operated by the operator of the snow vehicle 10. Although the mode selector 304 can employ any suitable arrangement of switches and modes, in some embodiments, the model selector includes a mode selector switch 330. In some embodiments, the mode selector 304 further comprises a shift selector switch 332 and, in some embodiments, a neutral selector switch 334. The neutral selector switch 334 can be used to instruct the shift controller 300 to place the transmission in neutral. With the shift selector switch 332 the operator can select between an "auto" mode and a "manual" mode. In the auto mode, in some embodiments, the mode selector 304 instructs the shift controller 300 to shift the transmission automatically, for example as discussed previously with regard to FIGS. 26 and/or 27. Further, in some embodiments, when the auto mode is selected, the operator can further select between a number of shift modes, for example: Trail, Sport, Hill-climb, and Race. In some embodiments, the mode selector switch 330 can be repeatedly pressed to toggle between modes. Upon selection of the specified shift mode, in some embodiments, a light (e.g., light emitting diode) will signify which mode has been selected (e.g., when Trail mode is selected, the trail mode light 322 is illuminated; when the Sport mode is selected, the sport mode light 324 is illuminated; when Hill-climb mode is selected, the hill-climb mode light 326 is illuminated; when the Race mode is selected, the race mode light 328 is illuminated). While shown with a light associated with each mode, the information can be communicated to the operator in any appropriate way, such as on a gauge display, touchscreen, monitor, etc. Moreover, in some embodiments, the selected shift mode will influence how the shift controller 300 controls shifts and, in some embodiments, throttle response, and even the characteristics of the suspension (soft, stiff).

In some embodiments, the selected shift mode will direct the shift controller 300 to adjust shift points. By way of example, in the Trail mode, the transmission may shift from a first gear to a second gear at a lower RPM when compared to the Sport mode, in order to stay in a more favorable part of the engine's power-band. Further, in some embodiments, when in the Sport mode, the transmission may downshift from a higher gear at a higher RPM when compared to the Trail mode, in order to stay in a more favorable part of the engine's power-band. In some embodiments, the Sport mode will generally be associated with more aggressive driving than the Trail mode. In some embodiments, the Hill-climb mode will have a different shift profile than the Trail, Sport, and Race modes. Further, the Race mode will have a different shift profile than the Trail, Sport, and Hill-climb modes.

Figure 29:
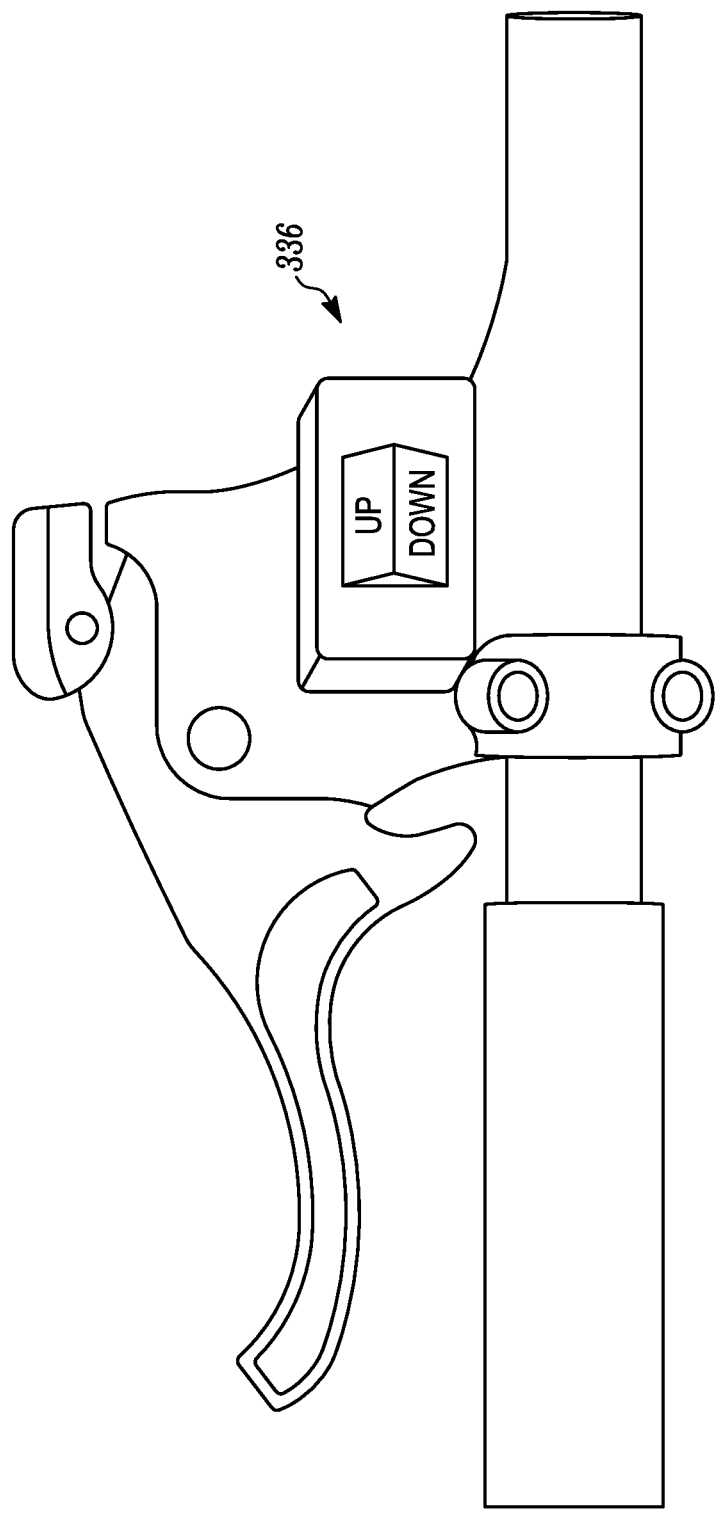
FIG. 29 shows an embodiment of a toggle shifter mounted to the handlebars of a snow vehicle 10.

In some embodiments, when operated in the manual mode, the operator will instruct the snow vehicle 10 when to undertake an upshift or downshift, for example via toggle shifter 336 (FIG. 29). In some embodiments, the toggle shifter 336 is mounted to the handlebars, for example on the left side of the handlebars 18 and above or below a portion of the grip. When the operator toggles "UP", the transmission shifts to the next higher gear and when the operator toggles "DOWN", the transmission shifts to the next lower gear. In some embodiments, while the operator is instructing the transmission to shift, the instructions are being routed through the shift controller 300 to carry out the operator's demand and, in some embodiments, prevent damage to components (e.g., where the operator selects a downshift that would over-rev the engine). In some embodiments, the manual mode relies on the shift controller 300.

In some embodiments, the shift controller 300 prevents the engine from stalling, for example by disengaging the clutch one the engine RPM drops below a threshold value via the clutch actuator 314. In some embodiments, an operator can place the snow vehicle 10 in gear (e.g., by toggling DOWN on the toggle shifter 336) while holding the first or second lever 32a, 32b, or both levers.

In some embodiments, the shift controller 300 automatically downshifts the transmission in order to reduce wear on drivetrain components. In some embodiments, the shift controller 300 downshifts the transmission in the event the shift controller 300 has employed the anti-stalling instructions. For example, in the event the shift controller 300 disengages the clutch due to a sensed stall of the engine, the shift controller 300 can also automatically downshift to the next lowest gear or appropriate gear. In some embodiments, gear range is shown on a gauge display in front of the operator.

The auto/manual/modes/neutral can all be selected by toggling a single switch. Further, these modes can be combined in any suitable combination of switches, etc., and information can be displayed to the operator in any suitable way.

What is claimed is:

1. A snow vehicle comprising:
   an endless track;
   a frame, an engine, and a transmission, the engine and transmission attached to the frame, the engine drivingly coupled to the endless track via the transmission;
   a clutch, at least a portion of the clutch being rotatably coupled to the transmission;
   a brake actuator;
   handlebars;
   a hand lever attached to the handlebars, the hand lever having a first position, a second position, and a third position, wherein movement of the hand lever from the first position to the second position actuates the clutch and movement of the hand lever from the second position to the third position actuates the brake actuator; and
   an actuator assembly, the actuator assembly comprising a main body and a master cylinder having a fluid housing, wherein the main body comprises a hydraulic brake piston and a hydraulic clutch piston, the hydraulic brake piston and hydraulic clutch piston being adjacent to the hand lever.

2. The snow vehicle of claim 1, wherein the brake actuator is hydraulic.

3. The snow vehicle of claim 1, wherein the fluid housing provides hydraulic fluid to the hydraulic brake piston and hydraulic clutch piston.

4. The snow vehicle of claim 1, wherein the hand lever comprises a first contact surface adjacent to the hydraulic clutch piston and a second contact surface adjacent to the hydraulic brake piston, the first contact surface being closer to the hydraulic clutch piston than the second contact surface is to the hydraulic brake piston when the hand lever is in the first position.

5. The snow vehicle of claim 4, wherein the first contact surface contacts the hydraulic clutch piston when the hand lever is in the first position and the second contact surface is spaced apart from the hydraulic brake piston.

6. A snow vehicle comprising:
   an endless track;
   a frame, an engine, and a transmission, the engine and transmission attached to the frame, the engine drivingly coupled to the endless track via the transmission;
   a clutch, at least a portion of the clutch being rotatably coupled to the transmission;
   a brake actuator;
   handlebars; and
   a combined clutch/brake hand lever attached to the handlebars, the combined clutch/brake hand lever having a first position, a second position, and a third position, wherein movement of the combined clutch/brake hand lever from the first position to the second position actuates the clutch and movement of the combined clutch/brake hand lever from the second position to the third position actuates the brake actuator.

7. The snow vehicle of claim 6, wherein the brake actuator is hydraulic.

8. The snow vehicle of claim 6, further comprising an actuator assembly, the actuator assembly comprising a main body and a master cylinder having a fluid housing.

9. The snow vehicle of claim 8, wherein the main body comprises a hydraulic brake piston and a hydraulic clutch piston, the hydraulic brake piston and hydraulic clutch piston being adjacent to the hand lever.

10. The snow vehicle of claim 9, wherein the fluid housing provides hydraulic fluid to the hydraulic brake piston and hydraulic clutch piston.

11. The snow vehicle of claim 8, wherein the combined clutch/brake hand lever comprises a first contact surface adjacent to the hydraulic clutch piston and a second contact surface adjacent to the hydraulic brake piston, the first contact surface being closer to the hydraulic clutch piston than the second contact surface is to the hydraulic brake piston when the combined clutch/brake hand lever is in the first position.

12. The snow vehicle of claim 11, wherein the first contact surface contacts the hydraulic clutch piston when the combined clutch/brake hand lever is in the first position and the second contact surface is spaced apart from the hydraulic brake piston.

13. A snow vehicle comprising:
   an endless track;
   a frame, an engine, and a transmission, the engine and transmission attached to the frame, the engine drivingly coupled to the endless track via the transmission;
   a clutch, at least a portion of the clutch being rotatably coupled to the transmission;
   a brake actuator;
   handlebars;
   a hand lever attached to the handlebars, the hand lever having a first position, a second position, and a third position, wherein movement of the hand lever from the first position to the second position disengages the clutch and movement of the hand lever from the second position to the third position actuates the brake actuator to apply braking, wherein the hand lever actuates the brake actuator to apply braking only after the clutch has been disengaged; and
   an actuator assembly, the actuator assembly comprising a main body and a master cylinder having a fluid housing, wherein the main body comprises a hydraulic brake piston and a hydraulic clutch piston, the hydraulic brake piston and hydraulic clutch piston being adjacent to the hand lever.

14. The snow vehicle of claim 13, wherein the hand lever comprises a first contact surface adjacent to the hydraulic clutch piston and a second contact surface adjacent to the hydraulic brake piston, the first contact surface being closer to the hydraulic clutch piston than the second contact surface is to the hydraulic brake piston when the hand lever is in the first position.

15. The snow vehicle of claim 13, wherein the hand lever includes a first connection to a mechanical clutch cable and a second connection to a mechanical brake cable, wherein movement of the hand lever from the first position to the second position actuates the clutch via the mechanical clutch cable and movement of the hand lever from the second position to the third position actuates the brake actuator via the mechanical brake cable.

16. The snow vehicle of claim 13, wherein the hand lever includes a connection to a mechanical brake cable and a contact surface that contacts a hydraulic piston, wherein movement of the hand lever from the first position to the second position actuates the clutch via engagement of the contact surface with the hydraulic piston and movement of the hand lever from the second position to the third position actuates the brake actuator via the mechanical brake cable.

* * * * *